United States Patent [19]
Johnson et al.

[11] Patent Number: 5,845,123
[45] Date of Patent: Dec. 1, 1998

[54] DIGITAL PROCESSOR FOR SIMULATING OPERATION OF A PARALLEL PROCESSING ARRAY

[75] Inventors: Martin Johnson, Malvern Wells; Robin Jones, Malvern Link; David S. Broomhead, Malvern Wells, all of England

[73] Assignee: The Secretary of State for Defence in Her Britannic Majesty's Government of the United Kingdom of Great Britain and Northern Ireland, London, England

[21] Appl. No.: 969,177

[22] PCT Filed: Aug. 15, 1991

[86] PCT No.: PCT/GB91/01390

§ 371 Date: Feb. 12, 1993

§ 102(e) Date: Feb. 12, 1993

[87] PCT Pub. No.: WO92/03802

PCT Pub. Date: Mar. 5, 1992

[30] Foreign Application Priority Data

Aug. 16, 1990 [GB] United Kingdom .................. 9018048

[51] Int. Cl.$^6$ .............................. G06F 15/82; G06F 13/00
[52] U.S. Cl. ............................................ 395/377; 395/800
[58] Field of Search ..................................... 395/800, 377; 364/229.2, 231.9

[56] References Cited

U.S. PATENT DOCUMENTS

| | | | |
|---|---|---|---|
| 4,247,892 | 1/1981 | Lawrence | 385/200.01 |
| 4,773,038 | 9/1988 | Hillis et al. | 395/500 |

(List continued on next page.)

FOREIGN PATENT DOCUMENTS

| | | |
|---|---|---|
| 0 237 218 | 2/1987 | European Pat. Off. . |
| 0 298 658 | 1/1989 | European Pat. Off. . |

OTHER PUBLICATIONS

Parallel Algorithms & Architectures: Roceedings of the International Workshop on Parallel et al, 14 Apr. 1986, Luminy, France pp. 349–358. Milcom 88, vol. 1, 23 Oct. 1988, San Diego, USA, pp. 205 209.
Systolic Processor Array for Radar and Communications; Lackey et al, see p. 207, right col. line 1—p. 208, right col. line 14, figure 4. International Conference on Systolic Arrays, 25 May 1988, San Diego, USA pp. 125–134.
Tnimoto et al., An Image Based on an Array of Pipelines, 1981 IEEE Workshop on Computer Arch.; Nov. 11, 1981; pp. 201–208.

*Primary Examiner*—William M. Treat
*Assistant Examiner*—Kenneth R. Coulter
*Attorney, Agent, or Firm*—Nixon & Vanderhye P.C.

[57] ABSTRACT

A digital processor for simulating operation of a parallel processing array incorporates digital processing units ($P_1$ to $P_8$) communicating data to one another via addresses in memories ($M_0$ to $M_8$) and registers ($R_{11}$ to $R_{41}$). Each processing unit (e.g. $P_1$) is programmed to input data and execute a computation involving updating of a stored coefficient followed by data output. Each computation involves use of a respective set of data addresses for data input and output, and each processing unit (e.g. $P_1$) is programmed with a list of such sets employed in succession by that unit. On reaching the end of its list, the processing unit (e.g. $P_1$) repeats it. Each address set is associated with a conceptual internal cell location in the simulated array (10), and each list is associated with a respective sub-array of the simulated array (10). Data is input cyclically to the processor (40) via input/output ports ($I/O_5$ to $I/O_8$) of some of the processing units ($P_5$ to $P_8$). Each processing unit (e.g. $P_1$) executes its list of address sets within a cycle at a rate of one address set per subcycle. At the end of its list, each of the processing units ($P_1$ to $P_8$) has executed the functions associated with a conceptual respective sub-array of simulated cells (12), and the processor (40) as a whole has simulated operation of one cycle of a systolic array (10). Repeating the address set lists with further processor input provides successive simulated array cycles.

5 Claims, 16 Drawing Sheets

U.S. PATENT DOCUMENTS

| | | | |
|---|---|---|---|
| 4,827,403 | 5/1989 | Steele, Jr. et al. | 395/800 |
| 4,922,418 | 5/1990 | Dolechek | 395/185.04 |
| 4,943,909 | 7/1990 | Huang | 395/800 |
| 5,018,065 | 5/1991 | McWhirter et al. | 395/800 |
| 5,136,717 | 8/1992 | Morley et al. | 395/800 |
| 5,179,714 | 1/1993 | Graybill | 395/800 |
| 5,193,202 | 3/1993 | Jackson et al. | 395/406 |
| 5,249,274 | 9/1993 | Sztipanovits et al. | 395/377 |
| 5,249,301 | 9/1993 | Keryvel et al. | 395/800 |
| 5,377,306 | 12/1994 | Broomhead et al. | 395/20 |

Fig. 2. (PRIOR ART)
BOUNDARY CELL
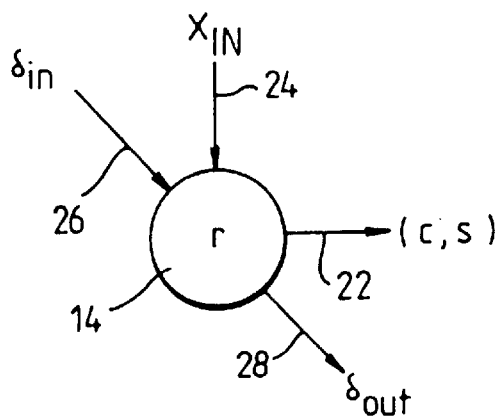
IF $x_{IN} = 0$, THEN
    $c = 1$; $s = 0$; $\delta_{out} = \delta_{in}$
ELSE :-
    $r' = (r^2 + x_{IN}^2)^{\frac{1}{2}}$
    $c = r/r'$
    $s = x_{IN}/r'$
    $r \text{ (UPDATED)} = r'$
$\delta_{out} = c\, \delta_{in}$
INTERNAL CELL
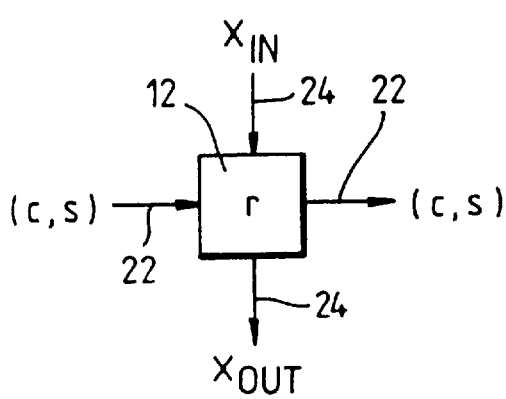
$x_{OUT} = -sr + c\, x_{IN}$
$r \text{ (updated)} = c\cdot r + s\cdot x_{IN}$

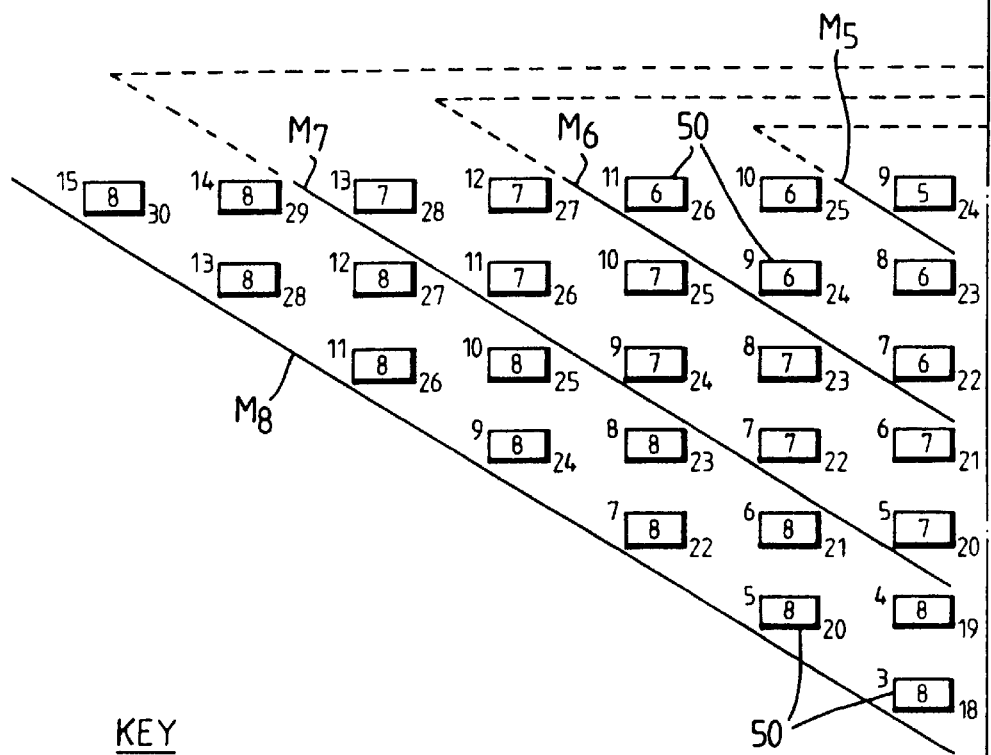

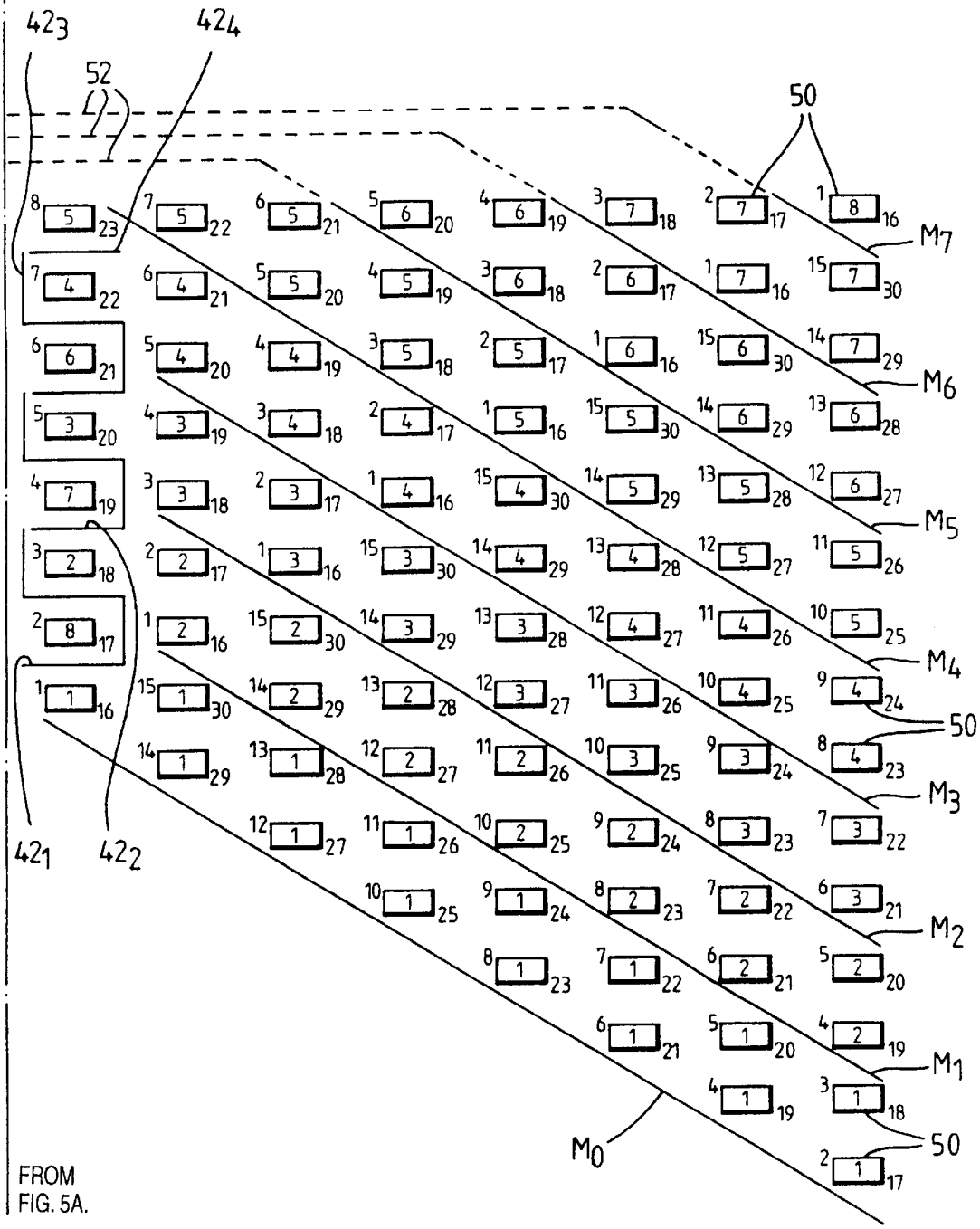

| OPERATION | SUBCYCLE 6 | | | | | | SUBCYCLE 7 | | | | | | |
|---|---|---|---|---|---|---|---|---|---|---|---|---|---|
| | RE1 | RE2 | RE3 | WR1 | WR2 | WR3 | RE1 | RE2 | RE3 | WR1 | WR2 | WR3 |
| $P_1$ ADDRESS | $M_1 12$ | $M_0 20$ | $M_0 19$ | $M_0 17$ | $M_0 16$ | $M_0 15$ | $M_1 17$ | $M_0 22$ | $M_0 21$ | $M_1 12$ | $M_1 14$ | $M_1 13$ |
| $P_2$ ADDRESS | $M_2 6$ | $M_1 14$ | $M_1 13$ | $M_1 11$ | $M_1 10$ | $M_1 9$ | $M_2 11$ | $M_1 16$ | $M_1 15$ | $M_2 6$ | $M_2 8$ | $M_2 7$ |
| $P_3$ ADDRESS | $M_3 0$ | $M_2 8$ | $M_2 7$ | $M_2 5$ | $I/O_3$ | $I/O_3$ | $M_3 5$ | $M_2 10$ | $M_2 9$ | $M_3 0$ | $I/O_3$ | $I/O_3$ |

TABLE 1

DIGITAL PROCESSOR FOR SIMULATING OPERATION OF A PARALLEL PROCESSING ARRAY

BACKGROUND OF THE INVENTION

1. Field of the Invention

This Invention relates to a digital processor for simulating operation of a parallel processing array, such as a systolic array.

2. Discussion of Prior Art

The field of parallel processing arrays was developed to overcome a well-known problem in conventional digital computers, the "Von Neumann bottleneck". This problem arises from the serial nature of conventional computers, in which program steps or Instructions are executed one at .a time and in succession. This means that the computer operating speed is restricted to the rate at which its central processing unit executes individual instructions.

To overcome the operating speed problem of conventional computers, parallel processors based on systolic array architectures have been developed One such is disclosed in British Patent No. OB 2, 151, 378B, which corresponds to U.S. Pat. No. 4,727,503. IL consists of a triangular array of internal and boundary cells. The boundary cells form the array diagonal and are interconnected via delay latches. The internal cells art in above-diagonal locations. The array includes nearest-neighbor cell interconnection lines defining rows and columns of cells. The cells are activated cyclically by a common system clock. Signal flow is along the rows and down the columns at the rate of one cell per clock cycle. Each cell executes a computational function on each clock cycle employing data input to the array and/or received from neighboring cells. Computation results are output to neighboring cells to provide input for subsequent computations. The computations of individual cells are comparatively simple, but the systolic array as a whole performs a much more complex calculation, and does so In a recursive manner at potentially high speed. In effect, the array subdivides the complex calculations into a series of much smaller cascaded calculations which are distributed over the array processing cells. An external control computer Is not required. The cells are clock-activated, each operates on every clock cycle. The maximum clock frequency or rate of processing is limited only by the rate at which the slowest individual cell can carry out its comparatively simple processing function. This results in a high degree of parallelism, with potentially high speed if fast processing cells are employed. The "bottleneck" of conventional computers is avoided.

The disadvantage of prior art systolic arrays is that, in all but the simplest problems, large numbers of cells are required. As will be described later in more detail, a prior art triangular array for dealing with an n-dimensional computation requires in the order of $n^2/2$ internal cells. In consequence, the number of internal cells required grows as the square of the number of dimensions of the computation. The number of boundary cells grows only linearly with number of dimensions. One important application of a triangular systolic array relates to processing signals from an array of sensors, such as a phased array of radar antennas. Typical radar phased arrays incorporate in the region of one thousand or more antennas, and a systolic array to process the antenna signals would require of the order of one million processing cells. Each cell requires the processing functions and connectivity capabilities of a transputer to enable communications between neighboring cells. Special purpose integrated circuits could also be used, in which "cells" constitute respective areas of a silicon chip or wafer. Since transputers are priced in excess of approximately $150 each, the cost of a systolic array would be prohibitively expensive for radar phased array purposes. It is also prohibitively expensive for many other signal processing applications characterized by high dimensionality.

There is a need for digital processing apparatus which has a degree of parallelism to overcome conventional computer disadvantages, but which requires fewer processing cells than a prior art systolic array.

It is known from EP-A-0 021 404 to employ an array of specially designed processors in a computer system for the simulation of logic operations. These processors operate in parallel. However, this prior art parallel array is disadvantageous in that data flow through it requires a multi-way switch operated by a computer. For i processors, the switch is i-by-i-way so that each processor can be connected to each of the others under computer control. This is not compatible with a systolic array architecture, in which (a) there is no controlling computer, (b) data flow paths in the array are fixed, (c) data flow is between nearest neighbors, (d) there are no external control instructions, and (e) conventional general purpose processors (eg transputers) may be used with programming to execute fairly straightforward arithmetic functions. Indeed, a major objective of systolic array architectures is to avoid the need for a controlling computer.

U.S. Pat. No. 4,622,632 to Tanimoto et al. relates to a pattern matching device which employs arrays of processors for operating on pyramidal data structures. Here the processors operate under the control of what is said to be a "controller", by which is presumably meant a control computer. The controller provides instructions to each of the processors in synchrony. The instructions both provide data store addresses and dictate which of its various processing functions an individual processor employs. Each processor performs a read-modify-write cycle in which data in a memory module is written back out to the same address from which it was obtained. As discussed above for EP-A-0,021, 404, this is not compatible with a systolic array architecture, in which (a) there is no controlling computer, (b) data flow paths in the array are fixed, (c) data flow is between nearest neighbors, and (d) there are no external control instructions.

SUMMARY OF THE INVENTION

It is an object of the present invention to provide a digital processor suitable for simulating operation of a parallel processing array such as a systolic array.

The present invention provides a digital data processor for simulating operation of a parallel processing array, the processor including an assembly of digital processing devices connected to data storing means, characterized in that:

(a) each processing device is programmed to implement a respective list of sets of storing means data addresses;

(b) each address set contains input data addresses and output data addresses which differ, and each such set corresponds to data input/output functions of a respective simulated array cell;

(c) each list of address sets corresponds to a respective sub-array of cells of the simulated array, and each such list contains pairs of successive address sets in which the leading address sets have input data addresses like to output data addresses of respective successive address sets, each list being arranged to provide for operations associated with simulated cells to be executed in reverse order to that corresponding to data flow through the simulated array; and (d) each processing device is programmed to employ a respective first address set to read input data from and write output data to the data storing means, the output data being generated in accordance with a computational function, to employ subsequent address sets in a like manner until the list is complete, and then to repeat this procedure cyclically.

The invention provides the advantage that it requires a reduced number of processing devices compared to a prior art array (such as a systolic array) which it simulates. The reduction is in proportion to the number of address sets per list. Each processing device is in effect allocated the functions of a number or sub-array of simulated array cells, and is programmed to execute the functions of a number of these cells in succession and then repeat. The simulated array operation is therefore carried out, albeit at a reduced rate. However, a degree of parallelism is preserved because the overall computation is distributed over an assembly of individual processing devices. In consequence, the parallelism advantage over a conventional computer is retained. The invention might be referred to as a semi-parallel processor.

The invention may be arranged so that each processing device communicates with not more than four other processing devices; it may then incorporate storing means including register devices and memories connected between respective pairs of processing devices. The invention may incorporate storing means arranged to resolve addressing conflicts; preferably however the address lists are arranged such that each register device and memory is addressed by not more than one processing device at a time. Some of the processing devices may be arranged to communicate with two of the other processing devices via respective register devices. In this case the address set lists are arranged such that the register devices are addressed less frequently than the memories.

Each processing device may be arranged to store and update a respective coefficient in relation to each address set in its list.

The invention may incorporate processing devices with input means arranged for parallel to serial conversion of input data elements. This enables the processor to implement simultaneous input as in the systolic array which it simulates.

BRIEF DESCRIPTION OF THE DRAWINGS

In order that the invention might be more fully understood, embodiments thereof will now be described, by way of example only, with reference to the accompanying drawings, in which:

FIGS. 1, 2 and 3 illustrate the construction and mode of operation of a prior art systolic array;

FIG. 5 illustrates the mode of operation of the FIG. 4 processor mapped on to the FIG. 1 array;

DETAILED DESCRIPTION OF PREFERRED EMBODIMENTS

Figure 1:
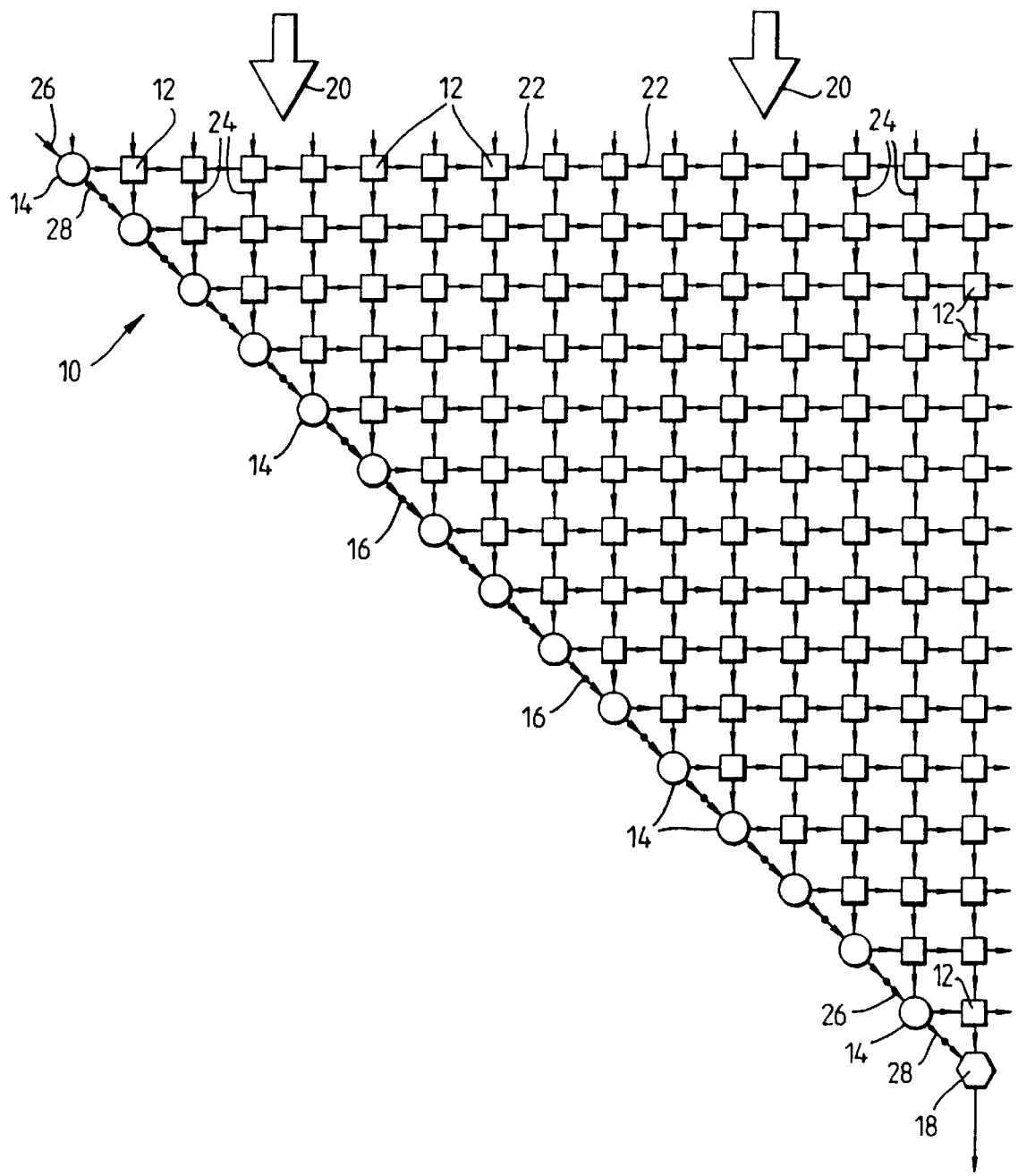

Referring to FIG. 1, a prior art triangular systolic array 10 is shown schematically. The array 10 is of the kind disclosed in British Patent No. 2,151,378B (U.S. Pat. No. 4,727,503). It includes a 15×15 above-diagonal sub-array of internal cells indicated by squares 12. A linear chain of fifteen boundary cells 14 shown as circles forms the triangular array diagonal. Adjacent boundary cells 14 are interconnected via one-cycle delay cells or latches indicated by dots 16. A multiplier cell 18 is connected to the lowermost internal and boundary cells 12 and 14. Each of the cells 12 to 18 is activated by a system clock (not shown), and the cells 12 to 16 carry out prearranged computations on each clock cycle. Input to the array 10 is from above as indicated by arrows 20. Horizontal outputs from boundary cells 14 pass along array rows as indicated by intercell arrows 22. Outputs from internal cells 12 pass down array columns as indicated by vertical intercell arrows 24. Boundary cells 14 have diagonal inputs and outputs such as 26 and 28 interconnected along the array diagonal via latches 16.

Referring now also to FIG. 2, the processing functions of the internal and boundary cells 12 and 14 are shown in greater detail. On each clock cycle, each boundary cell 14 receives an input value $x_{in}$ from above. It employs a stored coefficient r together with $x_{in}$ to Compute cosine and sine rotation parameters c and s and an updated value of r in accordance with:

$$r'=[r^2+x_{in}^2]^{1/2} \qquad (1)$$

For $X_{in}=0$, c=1 and s=0; otherwise:

$$c=r/r', \quad s=x_{in}/r' \qquad (2)$$

and $$r(updated)-r' \qquad (3)$$

The parameters c and s are output horizontally to a neighboring internal cell 12 to the right.

Each boundary cell 14 also multiplies an upper left diagonal input 6 in by the parameter c to provide a lower right diagonal output bout i.e.

$$\delta_{out}=c\delta_{in} \qquad (4)$$

This provides for cumulative multiplication of c parameters along the array diagonal.

On each clock cycle, each internal cell 12 receives input of c and s parameters from the left and $x_{in}$ from above. It computes $x_{out}$ and updates its stored coefficient r in accordance with:

$$x_{out}=-sr+cx_{in} \qquad (5)$$

$$r(updated)=cr+sx_{in} \qquad (6)$$

Figure 3:
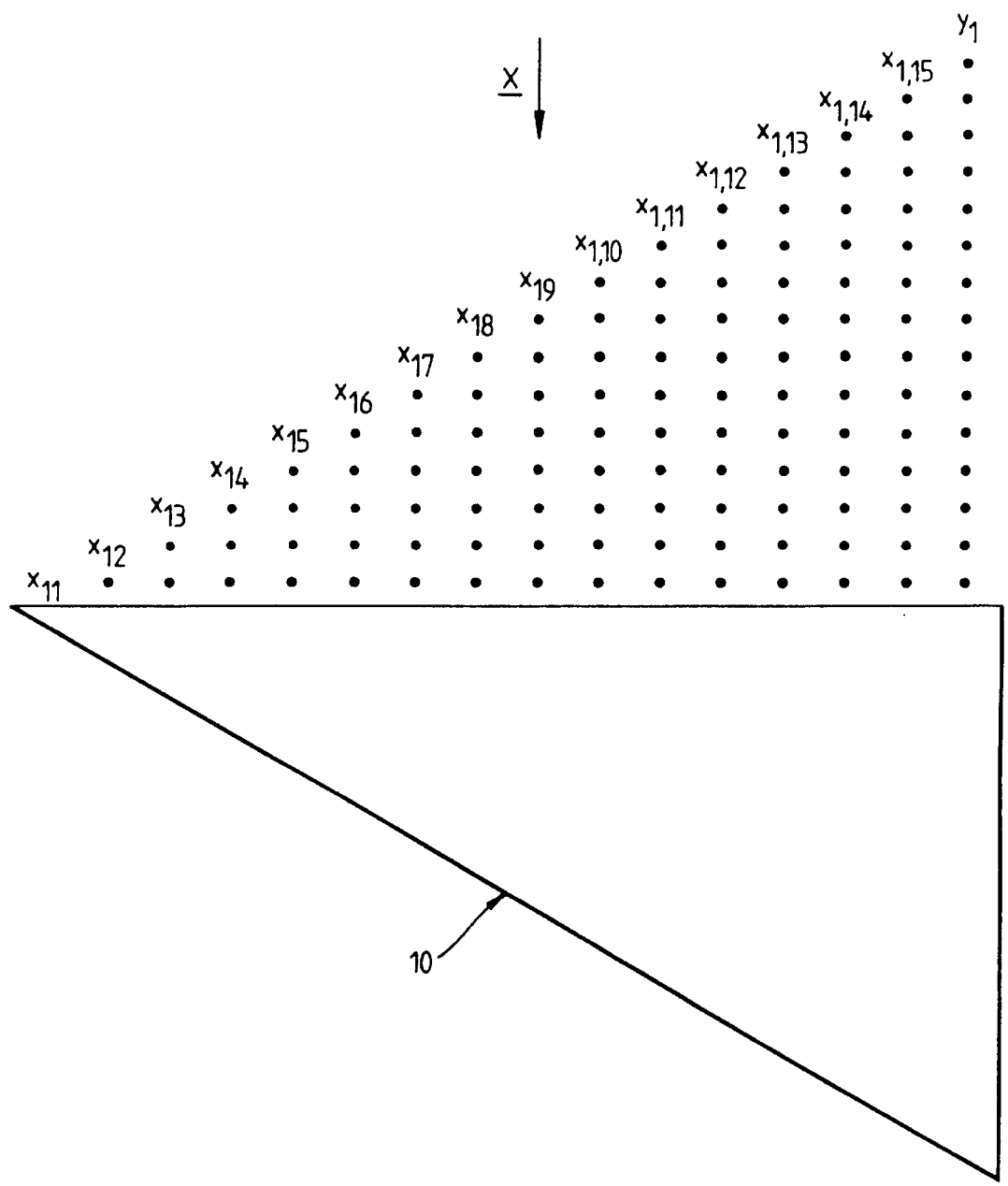

Data input to the array 10 is illustrated schematically in FIG. 3, in which the vertical dimension is shown foreshortened for illustrational convenience. FIG. 3 shows a first vector $\underline{x}_1$ and a first element $y_1$ in the process of input to the array 10. The vector $\underline{x}_1$ has fifteen elements $x_{11}$ to $x_{1,15}$, and is the leading row of a data matrix $\underline{X}$. A column vector $\underline{y}$ is input to the rightmost array column. The vector $\underline{y}$ has elements $Y_1, Y_2 \ldots$, and the nth element $Y_n$ appears as an extension of the nth row $x_{n1}$ to $x_{n,15}$ of the data matrix $\underline{X}$. As illustrated, $y_1$ extends $\underline{x}_1$.

The first element $x_{11}$ of the first input vector $\underline{x}_1$ is input to the top row (leftmost) boundary cell 14. Successive elements $x_{12}$, $x_{13}$, etc of $\underline{x}_1$ are input to successive top row internal cells 12 with a temporal skew. Temporal skews are well known in the art of systolic arrays. In the present case the skew is a delay of one clock cycle between input to adjacent top row cells of elements of like vectors. The skew increases linearly to the right, so that input of the ith element $x_{ni}$ of the nth vector $\underline{x}_n$ to the ith column of the array 10 lags input of $x_{n1}$ to the first column by (i-1) clock cycles.

When $x_{11}$ is input to the uppermost boundary cell 14, it is employed to compute rotation parameters c, s for transforming the first vector $\underline{x}_1$ into a rotated vector having a leading element of zero. On the clock cycle following input of $x_{11}$ to the uppermost boundary cell 14, $X_{12}$ is input to its row neighbor internal cell 12 in synchronism with input of c, s computed from $x_{11}$. One clock cycle later, the parameters c, s derived from $x_{11}$ reach the third cell from the left in the top row and are used to operate on $x_{13}$. In this manner, c,s computed from $x_{11}$ are employed to operate on elements $x_{12}$ to $x_{1,15}$ and $y_1$ on successive clock cycles. This produces a rotated version of $\underline{x}_1$ from which $x_{11}$ is eliminated, the version passing to the second processor row. A similar procedure occurs in the second row, ie the rotated version of $x_{12}$ is used to compute c and s values for operation on the rotated versions of $x_{13}$ to $x_{1,15}$ and $y_1$. This procedure continues down the processor rows until all x-vector elements have been eliminated.

Subsequent data vectors $\underline{x}_2$, $\underline{x}_3$ etc representing further rows of the data matrix $\underline{X}$ are processed in the same way as $\underline{x}_1$ by input to the uppermost array row. In general, the ith element $x_{ni}$ of the nth data vector $\underline{x}_n$ is input to the ith array column on the (n+i+1) th clock cycle. Similarly, the nth element $y_n$ of the column vector $\underline{y}$ is rotated in each row as though it were an additional element of the nth data vector $\underline{x}_n$. Each cumulatively rotated version of $y_n$ passes to the multiplier cell 18. Here it is multiplied by the cumulatively multiplied c rotation parameters derived from $\underline{x}_n$ and computed along the array boundary cell diagonal. The output of the multiplier cell 18 is the least squares residual $e_n$ given by:

$$e_n = \underline{x}_n^T \underline{w}(n) + y_n \qquad (7)$$

where:

$\underline{x}_n^T$ is the transpose of $\underline{x}_n$, and $\underline{w}_n$ is a weight vector computed over all $\underline{x}_1$ to $\underline{x}_n$ to minimise the sum of the squares of $e_1$ to $e_n$.

In more general mathematical terms, the array 10 carries out a QR decomposition of the data matrix $\underline{X}$ as described in the prior art; ie the rotation algorithm operates on $\underline{X}$ to generate a matrix $\underline{Q}$ such that:

$$\underline{QX} = \begin{bmatrix} \underline{R} \\ 0 \end{bmatrix} \qquad (8)$$

where $\underline{R}$ is an upper right triangular matrix. The matrix elements r of $\underline{R}$ are stored on individual internal and boundary cells 12 and 14 in all but the rightmost array column, and are recomputed every clock cycle. At the end of computation, the elements r may be extracted from their storage locations and used to compute the weight vector explicitly.

FIGS. 1 to 3 exemplify a typical prior art systolic array arranged inter alia to carry out QR decomposition. The array 10 exhibits the following characteristics which typify systolic arrays:

(a) nearest-neighbor cell interconnections form rows and columns;

(b) many of cells (ie internal cells) have like signal processing functions;

(c) each cell performs its processing function on each system clock cycle; and (d) signal flow is generally down columns and along rows of the array.

Systolic arrays suffer from the major disadvantage of requiring large numbers of processing cells, such as internal cells 12 in particular. To perform a QR decomposition on the data matrix $\underline{X}$ and associated residual extraction involving the vector $\underline{y}$, the array 10 employs a linear chain of fifteen boundary cells 14 and a triangular sub-array of one hundred and twenty internal cells 12. The internal cells 12 form a 15×15 sub-array, and the array 10 as a whole is a 16×16 array. This arises from the fifteen-dimensional nature of the data matrix $\underline{X}$ and the one-dimensional nature of each element of the vector $\underline{y}$. Generally, the number of cells required in a systolic array grows as the square of the number of dimensions of the computation to be performed. In a version of the array 10 appropriate for an n-dimensional data matrix $\underline{X}$, n(n+1)/2 internal cells 12 would be required. Each cell is of the order of complexity of a microprocessor having floating point arithmetic capability, and requires the ability of a transputer to communicate with up to four neighbours. For computations where n is in the order of 100 or greater, the number of cells is of order $10^4$ or more. The cost and bulk of such an array is therefore unacceptably large for many purposes.

Referring now to FIG. 4, there is shown a processor 40 of the invention. The processor 40 incorporates eight processing units $P_1$ to $P_8$ with respective associated two-port memories $M_1$ to $M_8$. The unit $P_1$ is also associated with a two-port memory $M_0$. The units $P_1$ to $P_8$ are connected to respective decoders $D_1$ to $D_8$ and input/output ports $I/O_1$ to $I/O_8$. The input/output ports $I/O_1$ to $I/O_8$ are shown in simplified form to reduce illustrational complexity, but will be described in more detail later. Each is arranged to accept up to four digital words simultaneously in parallel, and to transfer them serially to a corresponding processing unit $P_1$ to $P_8$. They also provide for serial word output.

The ith processing unit $P_i$ (i=1 to 8) is associated with a respective data bus $B_i$ and memory address bus $A_i$. The ith address bus $A_i$ connects processing unit $P_i$ to memories $M_i$ and $M_{i-1}$. Each of the input-output ports $I/O_1$ to $I/O_8$ has complex read/write and data input/output connections (not shown) to external circuitry. These will be illustrated in detail later. In FIG. 4, they are indicated schematically by respective buses $41_1$ to $41_8$. The ith data bus $B_i$ connects processing unit $P_i$ to memories $M_i$ and $M_{i-1}$, to port $I/O_i$ and to a block of word registers indicated generally by 42. The register block 42 incorporates three sections $42_1$ to $42_3$ each of four registers $R_{11}$ to $R_{34}$, the ith section $42_i$ (i=1 to 3) consisting of registers $R_{i1}$ to $R_{i4}$. The block 42 also includes a fourth section $42_4$ consisting of one register $R_{41}$. Each register $R_{ij}$ is shown with a single or double arrow indicating its input side (left or right) and the number of digital words stored; ie single and double arrows correspond to one and two stored words respectively. Each register is a first in, first out (FIFO) device. Registers $R_{11}$, $R_{21}$, $R_{31}$ and $R_{41}$ are one word devices receiving input from the left and providing output to the right. Register inputs and outputs are unreferenced to reduce illustrational complexity. Registers $R_{12}$, $R_{22}$ and $R_{32}$ are also one word devices, but input from the right and output to the left. Registers $R_{13}$, $R_{14}$, $R_{23}$, $R_{24}$, $R_{33}$ and $R_{34}$ are two word devices which input from the left and output to the right.

The ith section of registers $42_i$ (i=1 to 4) is connected to data bus $B_{9-i}$ to its left, each register having a respective bus branch connection. The upper three registers (eg $R_{32}$ to $R_{34}$) of the ith section $42_i$ (i=1 to 3) are connected to data bus $B_{i+1}$ (eg $B_4$) to their right. However, the lowermost register $R_{i1}$ in the ith section $42_i$ (i=1 to 4) is connected to data bus $B_i$.

The processing units $P_1$ to $P_8$ have respective read-write output lines $R/W_1$ to $R/W_8$ connected to ports $I/O_1$ to $I/O_8$, associated memories $M_0$–$M_1$ to $M_7$–$M_8$ and registers $R_{11}$, $R_{12}$ to $R_{21}$ etc. The lines $R/W_1$ etc are each two bits wide as indicated by /2. The units $P_1$ to $P_8$ are also connected to their respective decoders $D_1$ to $D_8$ by three-bit chip address lines $C_1$ to $C_8$ marked /3.

Each of the decoders $D_1$ to $D_8$ has seven one-bit output lines such as $D_2$ lines 44 for example, and these lines are connected to respective memory, I/O port and register devices $M_1$, $I/O_1$, $R_{11}$ etc. Some decoder lines such as those at 46 of $D_5$ are surplus to requirements. These are left unconnected as indicated by X symbols. X symbols also indicate unconnected buses below memories $M_0$ and $M_8$.

The mode of operation of the processor 40 as compared to that of the prior art device 10 is illustrated in FIG. 5. In this drawing, conceptual locations of internal cells 12 in the device 10 are indicated as rectangles such as 50. The scale of the drawing is vertically foreshortened for illustrational convenience. Each of the processing units $P_1$ to $P_8$ executes the computational tasks of a respective fifteen internal cells 12. In accordance with this, each rectangle 50 incorporates within it a number indicating the associated processing unit; ie rectangles 50 (and the internal cells 12 they represent) referenced internally with the numeral i (i=1, 2, . . . 7 or 8) are associated with processing unit $P_i$. Each rectangle also has external upper left and lower right indices V1 and V2 respectively, where V1 is in the range 1 to 15 and V2=V1+15 in each case. V1 and V2 respectively correspond to the first and second intervals in time at which the relevant processor in each case carries out the function of the internal cell associated with the location. The drawing also includes diagonal lines representing memories $M_0$ to $M_8$. Dotted lines 52 link different regions associated with respective common memories. Locations representing register sections are indicated by multi-cornered lines with like references $42_1$ to $42_4$.

In operation, each processing unit $P_i$ executes in sequence processing tasks which would be carried out by a respective fifteen internal cells 12 in the prior art. A cycle of operation of the prior art systolic array 10 therefore requires fifteen cycles of the processor 40 of the invention. The latter will be referred to as subcycles. Subcycles 1 to 15 consequently correspond to cycle 1, subcycles 16 to 30 to cycle 2 and so on. Numerals V1 and V2 in FIG. 3 are subcycle numbers. On subcycles or V1 values 1 to 15, processing unit $P_1$ executes the processing functions of internal cells located in the lower sections of the two lowest diagonals of the array 10, as indicated by numeral 1 within corresponding rectangles 50 in FIG. 5. Unit $P_1$ begins on subcycle 1 with a computation corresponding to the function of that internal cell 12 in the centre of the lowest diagonal of the array of cells, as indicated by an upper left V1 value of 1. On subcycle 2, as indicated by V1=2, unit $P_1$ carries out a first cycle computation corresponding to the lowermost internal cell 12 in the final (rightmost) column. On subcycle 3, the computation is that of the internal cell 12 in the penultimate (second lowest) row and final column. This procedure is repeated on successive subcycles, the conceptual location of the processing operation reducing by one in row or column position alternately. After subcycle 15, ie after the end of cycle 1, the computation executed is that of the lowest internal cell at the center of the lowest diagonal once more, as indicated by V2=16, and thereafter the sequence repeats to implement cycle 2. Similar processing sequences are executed by processing Units $P_2$ to $P_8$. Units $P_2$, $P_3$ and $P_4$ carry out computations corresponding to respective pairs of part minor diagonals. The equivalents for units $P_5$, $P_6$ and $P_7$ are two respective complete minor diagonals together with two respective part minor diagonals. For unit $P_8$, there is a single upper right location and the upper parts of diagonals having lower parts associated with $P_1$.

Each of the units $P_1$ to $P_8$ reads from and writes to respective memories among $M_0$ to $M_8$ and register sections $42_1$ to $42_4$. Memories and registers are illustrated in FIG. 5 adjacent the conceptual internal cell locations to which they are interfaced. For example, throughout each cycle processing unit $P_1$ communicates with memories $M_0$ and $M_1$, but also communicates with register section $42_1$ on subcycle 1 (ie one subcycle per cycle). Unit $P_2$ communicates with register section $42_1$ on subcycle 1 and both register sections $4_{21}$ and $42_2$ on subcycle 3.

Figure 6:
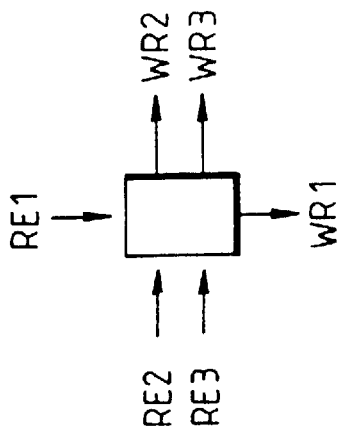
FIG. 6 illustrates read and write functions of a processing unit incorporated in the FIG. 4 processor.
Figure 7:
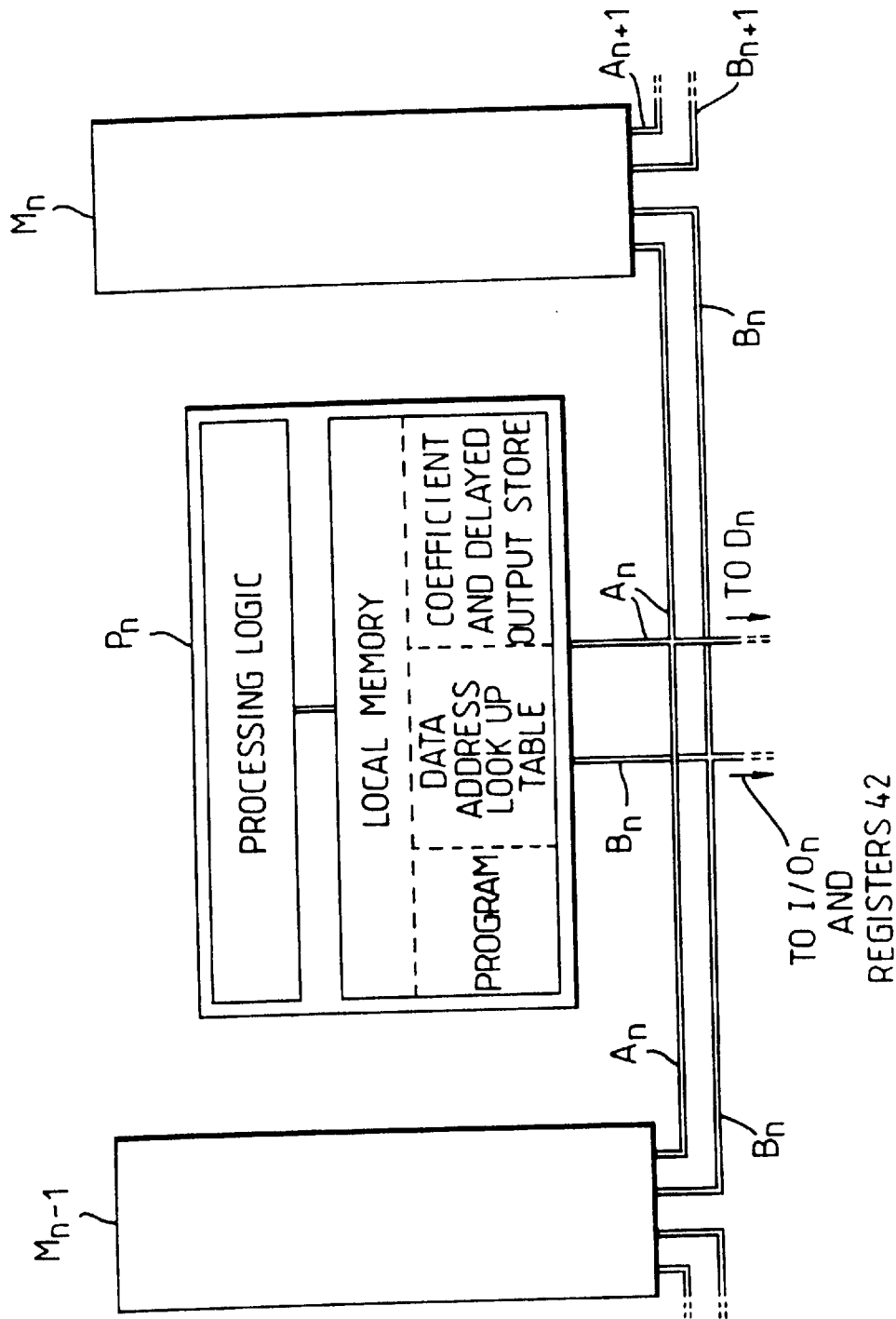
FIG. 7 illustrates memory and programming arrangements associated with individual processing units in the FIG. 4 processor.
Figure 8:
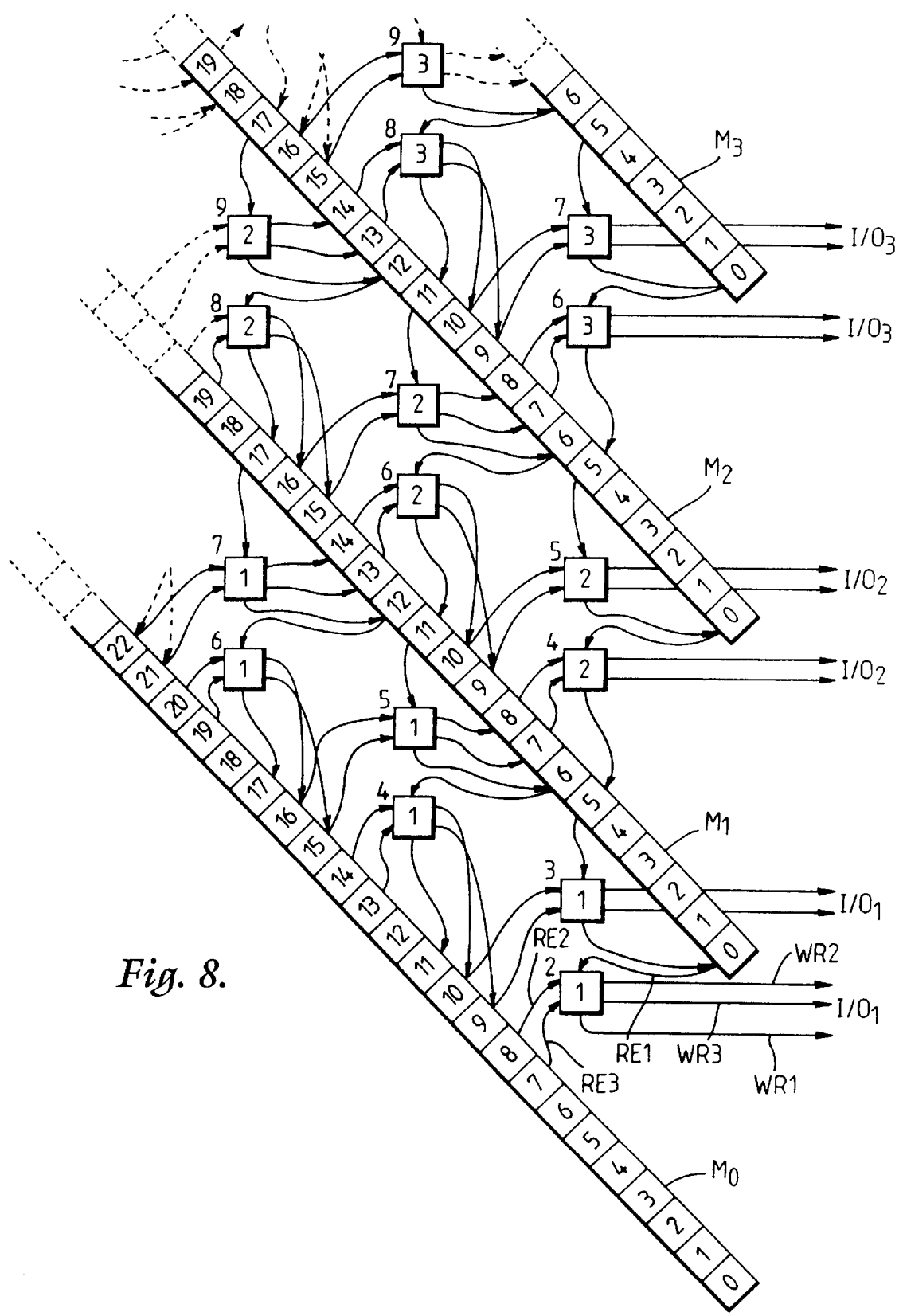
FIG. 8 schematically illustrates memory addressing in the FIG. 4 processor.

The mode of operation of the processor 40 of the invention will now be described in more detail with reference to Table 1 and FIG. 6 to 8. Parts in FIGS. 6 to 8 and Table 1 which were described earlier are like referenced. FIG. 2 illustrated each internal cell 12 receiving input of three quantities c, s and $x_{in}$, performing a computation and generating outputs c, s and $x_{out}$. This is re-expressed in FIG. 6 as three read operations RE1 to RE3 and three write operations WR1 to WR3. In FIG. 7, the nth processing unit Pn (n=1, 2, . . . 7 or 8) is shown connected between memories $M_{n-1}$ and $M_n$. It incorporates processing logic responsive to a stored program in local (ie internal) memory which also contains a data address look-up table and a coefficient store. The look-up table is a list of fifteen address sets, ie. one set per subcycle. The coefficient store has space for fifteen updatable coefficients of the kind r, and for temporary storage of a value for which an output delay is required. In FIG. 8, the lower right hand region of FIG. 5 is shown on an expanded scale. Memories $M_0$ to $M_3$ are shown subdivided into individual address locations labelled with integers. Not all address locations illustrated are employed. As in FIG. 5, in FIG. 8 each processing unit $P_1$ to $P_3$ (indicated by the relevant numerals within boxes) h as an upper left numeral indicating subcycle number. In Table 1, addresses in memories $M_0$ to $M_3$ are given for read and write operations in processing units $P_1$ to $P_3$ on subcycles 6 and 7. Addresses shown in FIG. 8 and Table 1 are in the range 0 to 22 for illustrational convenience, although in practice a typical memory address space would be 256 (8 bits) or greater.

As has been said, processing begins on subcycle 1, the first subcycle of the first cycle. However, it turns out that the first subcycle of each cycle is in fact a special case. In consequence, read/write operations on subcycles 2 onwards will first be describe d as being typical , and those of subcycle 1 will be discussed later.

Processing unit $P_1$ operates as follows. Referring to FIGS. 4, 7 and 8 once more, for each subcycle the stored program in local memory has three successive read instructions; each of these requires data to be read from three data addresses of a respective address set stored in the local memory look-up table and corresponding to the current subcycle of operation. The look-up table also stores values for the chip address lines $C_1$, which are equivalent to a three-bit extension of the address bus $A_1$. In Table 1, $M_nZ$ designates address Z in memory $M_n$. On subcycle 2, the read operations RE1, RE2 and RE3 for processing unit $P_1$ are from addresses $M_10$, $M_08$ and $M_07$ respectively. The unit $P_1$ places an address on address bus $A_1$ corresponding to Z=0, and places a three-bit code on chip address lines $C_1$ providing for $M_1$ to be enabled by decoder $D_1$ and for $M_0$, $R_{11}$ and $I/O_1$ to be disabled. It also places a two-bit "read" code on read/write line pair $R/W_1$ to signify a read operation. This causes memory $M_1$ to place the contents of its address 0 on the data bus $B_1$, where it is read by processing unit $P_1$ as RE1 and temporarily stored, Unit $P_1$ then changes the code output at $C_1$ to that required for decoder $D_1$ to enable $M_0$, and changes the address on bus $A_1$ to Z=8 and subsequently to Z=7. This provides for successive read operations RE2 and RE3 from addresses 8 and 7 of $M_0$.

Having carried out three read operations in succession on subcycle 2, unit $P_1$ executes the internal cell computations shown in FIG. 2 to generate $x_{out}$ and r (updated) for the second conceptual internal cell with which it is associated. It replaces its internally stored value of the second of fifteen coefficients r (initially zero) by r (updated), and is then ready to output the newly computed $x_{out}$ together with two unchanged input values (c, s input as RE2, RE3). On subcycle 2, unit $P_1$ performs the function of the lowermost internal cell 12 of FIG. 1, which provide c, s and $x_{out}$ signals to destinations outside the internal cell sub-array. In the processor 40, this situation is implemented by write operations to an input/output port. The processing unit $P_1$ consequently executes three successive write operations to port $I/O_1$. It obtains from its look-up table the next three chip address codes. These are in fact the same code, that required to access port $I/O_1$ and for which no address on bus $A_1$ is needed. They form the second half of the first address set. Unit $P_1$ places on chip address lines $C_1$ the chip address code obtained from the look-up table. This activates decoder $D_1$ to enable port $I/O_1$, and unit $P_1$ subsequently places a two-bit "write" code on line pair $R/W_1$ and places values $x_{out}$, c and s in succession on data bus $B_1$ as WR1, WR2 and WR3 respectively. This routes the values to subsequent signal processing circuitry (not shown) interfaced to port $I/O_1$.

Subcycle 2 ends when WR3 has been output, and processing unit $P_1$ proceeds to implement the subcycle 3 functions. These require reading from $M_15$, $M_010$ and $M_09$, and writing to $M_10$ (WR1) and $I/O_1$ (WR2 and WR3), which form the third address set of unit $P_1$. The WR1 function overwrites the contents of $M_10$ read on the preceding subcycle. Unit $P_1$ also computes and internally stores an updated R-matrix element r appropriate to its third associated internal cell location (V1=3). On later subcycles, as shown in FIG. 8, the read and write operations are to and from memory addresses in $M_0$ and $M_1$. Table 1 gives the read and write memory addresses in $M_0$ to $M_3$ and port $I/O_3$ for processing units $P_1$ to $P_3$ on subcycles 6 and 7.

Processing unit $P_1$ reads from memories $M_0/M_1$ and writes to those memories and/or port $I/O_1$ exclusively during subcycles 2 to 15. On subcycle 1 however, as indicated in FIG. 5, it is interfaced with register section $42_1$ immediately above. As shown in FIG. 6, RE1 is read from above. It is therefore received from register $R_{11}$ of register section $42_1$ in response to an enable signal from decoder $D_1$. Register $R_{11}$ receives input from the eighth processing unit $P_8$ on later cycles.

Subcycle 1 is a special case In the operation of processing unit $P_1$. So also are subcycles 16, 31 etc, ie the first subcycle of each cycle and numbered (15(n-1)+1), n=1, 2, 3 etc. These are also special case for the other processing units $P_2$ to $P_8$. The reason is as follows. In the simulated systolic array 10, data and result flow is downwards and to the right. It progresses at the rate of one cell per clock cycle along rows and down columns. An internal cell having a neighbor to its left or above receives data from the neighbor which the neighbor used or computed one cycle earlier. In the processor 40 however, as shown In FIG. 5, a processing unit ($P_1$ etc) proceeds conceptually upwards and to the left on successive subcycles in the reverse of the systolic array data flow direction. In consequence of this, inputs to a processing unit $P_1$ etc from a neighboring location arc not generated one cycle earlier, but instead one cycle minus one subcycle earlier. For most of each cycle this difference is immaterial, However, on subcycle 1 (and later equivalents) the right hand neighboring location corresponds to subcycle 15; ie these two subcycles are the beginning and end of the same first cycle. The right hand location (V1=15, V2=30) is fourteen subcycles behind the left hand location (V1=1, V2=16) in this special case, instead of being one subcycle ahead as elsewhere in the cycle. In consequence, in the absence of arrangements to the contrary, right hand outputs (values c, s output as WR2, WR3) from processing unit $P_1$ on subcycle 1 of the first cycle would be used as inputs on subcycle 15 of the first cycle. Similarly, the vertical output ($x_{out}$=WR1) from processing unit $P_1$ on subcycle 1 to memory $M_0$ would occur too early. This would conflict with the systolic array processing requirement that a result generated by a processing cell on one cycle is to be employed by a neighbor to its right or below on the succeeding cycle. Similar remarks apply to all other processing units $P_2$ to $P_8$.

To deal with this timing problem, on the first subcycle of each cycle, ie subcycle (15(n-1)+1), n=1, 2, 3 etc, the processing units $P_1$ to $P_8$ store internally their current values of $x_{out}$, c and s. They each output as WR1, WR2 and WR3, the respective values of $x_{out}$, c and s which they stored on the preceding cycle (if any). In consequence, on (and only on) the first subcycle of each cycle, outputs from the processing units $P_1$ to $P_8$ are delayed by one cycle. This involves an additional three storage locations in each processing unit's Or internal coefficient store.

At the end of subcycle 15, the first cycle of operations of unit $P_1$ is complete and subcycle 16 begins the second cycle (V2=16 to 30). As shown in FIG. 5, processing unit $P_1$ reverts to execution of the computation of the internal cell 12 at the centre of the lowermost diagonal. On cycle 2 (subcycles 16 to 30) the unit $P_1$ reads in data (if any) stored in memories $M_0$ and $M_1$ and register $R_{11}$ during cycle 1. It temporarily stores three data values to implement a one cycle delay. It also stores fifteen values of r in the process of updating, each r corresponding to a respective prior art internal cell.

Similar remarks apply to other processing units $P_2$ to $P_8$ and to later cycles. In general, a processing unit $P_n$ reads from and writes to its associated memories $M_{n-1}$ and $M_n$ (n=1 to 8) for most of a cycle. Exceptions to this are as follows. Units $P_5$ to $P_8$ execute RE1 ($x_{in}$) from respective ports $I/O_5$ to $I/O_8$ when performing computations corresponding to internal cells 12 in the uppermost row of the FIG. 1 prior art array 10. Units $P_5$, $P_6$ and $P_7$ are in this situation on four subcycles of each cycle (eg unit $P_5$ on subcycles 6 to 9 of cycle 1), but unit $P_8$ only three. This "uppermost" RE1 operation is equivalent to input of an element of a data matrix X (see FIG. 3) to an array 10. All eight processing units $P_1$ to $P_8$ execute processing functions corresponding to internal cells in extreme right hand column locations at respective points in each cycle. Units $P_1$ to $P_7$ are in this situation for two subcycles per cycle, whereas the equivalent for unit $P_8$ is only one subcycle. When in this situation, the units $P_1$ to $P_8$ execute WR2 and WR3 to respective ports $I/O_1$ to $I/O_8$; $P_1$ executes WR1 to $I/O_1$ also for one of its two subcycles in this situation as previously described. This extreme right hand output function corresponds to output from the prior art internal cell sub-array of FIG. 1., Finally, a processing unit $P_i$(i=1 to 8) reads from or writes to units $P_{10-i}$ and/or $P_{9-i}$ via the intervening register block 42. Each register such as $R_{12}$ or $R1_3$ is a one or two word temporary storage device arranged on a first in, first out (FIFO) basis, as has been said. The registers $R_{11}$ to $R_{41}$ provide for communication between processing units which either do not share a common memory or require additional storage to avoid simultaneous memory addressing by two units. For example, as shown in FIG. 5, on each of subcycles. 3 and 5 processing unit $P_3$ performs two read operations RE2 and RE3 from unit $P_7$ via registers $R_{23}$ and $R_{24}$ of register block $42_2$. On subcycle 3, unit $P_3$ reads the first stored words in registers $R_{23}$ and $R_{24}$, and on subcycle 5 it reads the succeeding words stored therein. It also reads the contents of $R_{31}$ as RE1 and writes to $R_{22}$ as WR1 on subcycle 5. Other read/write operations are to and from memories $M_2$ and $M_3$. Similar remarks apply to other pairs of processing units interfaced together via the register block 42.

The processing units $P_1$ to $P_8$ operate in synchronism under the control of an external clock (not shown). This is similar to prior art systolic arrays and will not be described. As illustrated and described with reference to FIGS. 5, 6 and 8, the phasing of the read and write operations of the processing units $P_1$ to $P_8$ is arranged to ensure that each of the memories $M_0$ to $M_8$ is required to respond only to a single address input at any time. For example, on subcycle 5 in FIG. 8, units $P_1$ and $P_2$ carry out read-write operations to memories $M_0/M_1$ and $M_1/M_2$ respectively, which could cause a clash in access to $M_1$. However, unit $P_1$ begins (REI) by reading from $M_1$ when unit $P_2$ is reading from $M_2$. Consequently, the $P_1$ RE2 and RE3 operations are both from $M_0$, at which time $P_2$ has switched to addressing $M_1$. This phasing of read operations avoids memory address conflict. Similar remarks apply to write operations and processing units $P_3$ to $P_8$ and memories $M_3$ and $M_8$. A read operation is at the beginning of any subcycle and a write operation is at the end. A memory (eg. $M_1$) may consequently experience read and write operations on the same subcycle without conflict of addresses on an address bus (eg $A_2$); however, in general two simultaneous operations involving a single memory must be avoided. It is of course possible to accommodate such conflict at the expense of duplication of address buses and memories.

Figure 9:
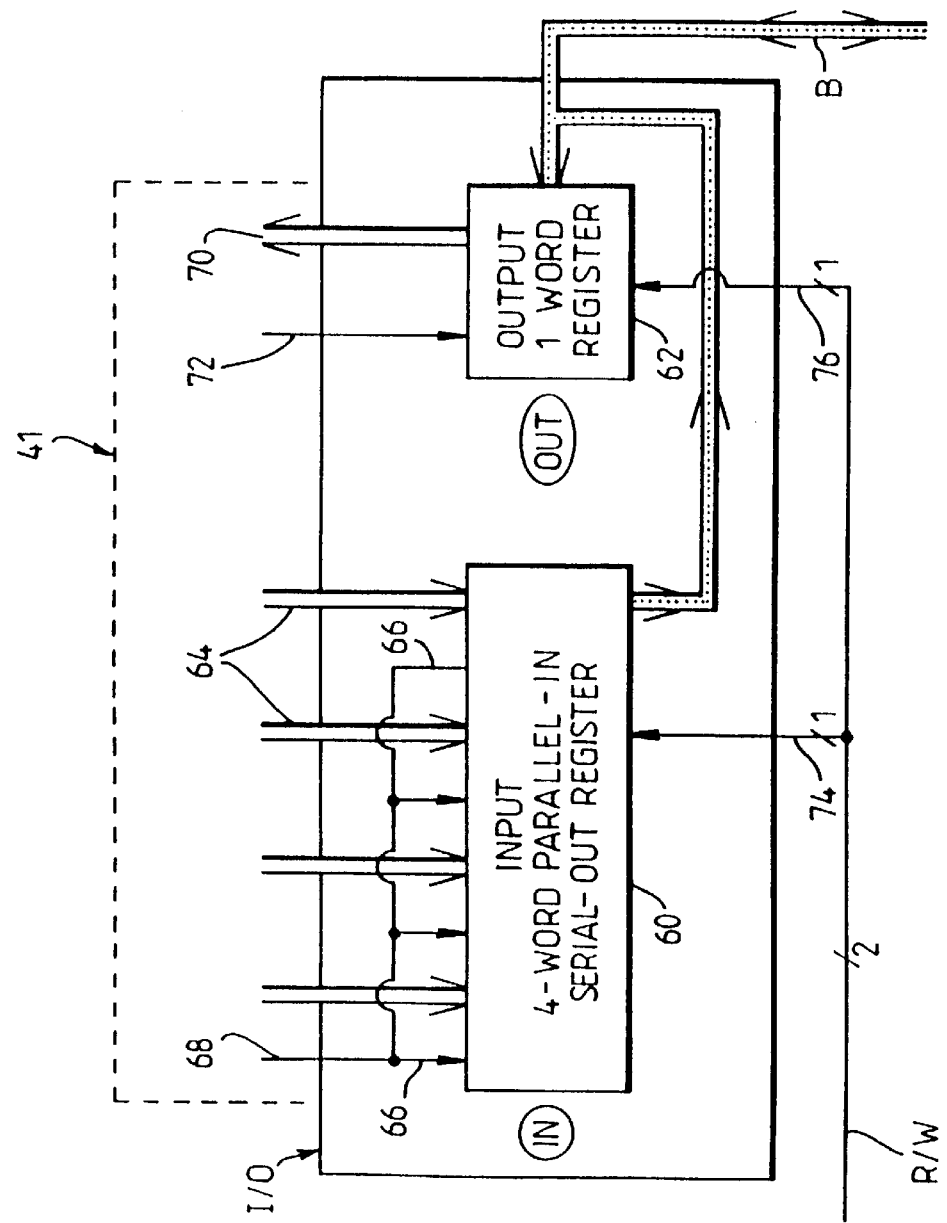
FIG. 9 is a block diagram of an input/output port for a processing unit.

Referring now also to FIG. 9, in which parts previously described are like-referenced, the structure of each of the input/output ports $I/O_1$ to $I/O_8$ is shown in more detail. Subscript indices to references (eg 1 in $I/O_1$) are omitted to indicate all parts of the relevant type, are referred to. The port I/O incorporates a four-word parallel-in/serial-out input register 60, together with a one-word parallel-in/parallel-out register 62. The input register 60 has four data input buses such as 64, and four write control inputs such as 66 connected to a common write line 68. The output register 62 has an output bus 70 and an associated read output line 72. The read/write fine pair R/W of FIG. 4 incorporates a read line 74 connected to the input register 60 and a write line 76 connected to the output register 62. The two-way data bus B is connected to both registers 60 and 62. The connections 64 to 72 inclusive were indicated to collectively by bus 41 in FIG. 4.

The port I/O operates as follows. Immediately prior to the first subcycle of each cycle of operation of the processor 40, the write line 68 of the input register 60 is pulsed, and four digital data words are applied simultaneously to respective register inputs 64. This overwrites existing register contents and loads the four words in the register 60 in a successively disposed manner. Each time the read line 74 is pulsed, the word associated with the right hand input 64 is placed on the data bus B, and the remaining words are shifted to the right. This provides for the four loaded words to be output on the data bus B one after the other in response to four successive read line pulses. Referring now also to FIG. 5 once more, it can be seen that processing unit $P_6$ requires to read data from $I/O_6$ when it is performing top row computations on subcycles (V2 values), 19, 20, 25 and 26. On each of these subcycles, the unit $P_6$ will send out a respective read pulse on line pair $R/W_6$, and requires a respective digital word to be placed on data bus $B_6$ by its input register 60 consisting of the correct matrix element $x_{ij}$ of the data matrix $\underline{X}$ previously referred to. Unit $P_6$ deals with the 5th, 6th, 11th and 12th top row cell locations. Matrix elements of the kind $x_{n,6}$, $x_{n-1,7}$, $x_{n-6,12}$ and $x_{n-7,13}$ are therefore simultaneously input to the register 60 of unit $P_6$. Here n is a positive integer, and n-k less than or equal to zero is interpreted as $x_{n-k,q}$ equal to zero for all q. Input is at the end of the last (fifteenth) subcycle of each cycle as has been indicated. This ensures that the data is present to be read in over the next cycle by different processing units executing top row computations at different times. The processing unit $P_6$ reads in data words in reverse order (ie $x_{n-7,13}$ leading) on two successive subcycles followed by a four subcycle gap then two further subcycles.

Similar remarks apply to input to processing units $P_5$, $P_7$ and $P_8$. Unit $P_5$ requires input from part $I/O_5$ on four successive subcycles, whereas three successive inputs from port $I/O_8$ suffice for unit $P_8$. Unit $P_7$ requires input from port $I/O_7$ on four subcycles of which the first and last pairs are separated by eight subcycles.

In practice, the input registers 60 of the processing units $P_5$ to $P_8$ are arranged and loaded in parallel; they receive data simultaneously once per cycle. This occurs immediately prior to processing unit $P_8$ computing the function of the uppermost and extreme right location (V1=1, V2=16) in FIG. 5. It simulates the prior art systolic array 10, which receives top row inputs simultaneously. The contents of the registers 60 are overwritten by each succesive input. As will be described later in more detail, meaningful data (ie $x_{12}$) is first processed by unit $P_8$ on subcycle 30, the data having been input at 60 prior to subcycle 16. Thereafter the data remains in the registers 60 until overwritten at the end of subcycle 30.

Output from the processor 40 via a port I/O of the kind shown in FIG. 9 is comparatively simple. A write pulse on the line 76 clocks the contents of data bus B into the output register 62. The read output line 72 is pulsed by external circuitry (not shown) to read the register contents on to the output bus 70. A succeeding write pulse at 76 provides for the register contents to be overwritten. External circuitry (not shown) is arranged to read from the output register 62 up to five times per cycle, this being the maximum number of output values per cycle from a single port I/O. In the present example of the invention, processing units $P_1$ to $P_4$ only require output facilities such as output register 62. However, it is convenient to treat all units $P_1$ to $P_8$ as having like I/O ports.

Referring to FIGS. 1 and 5 once more, it is useful to compare the operation of the prior art device 10 with that of the processor 40 of the invention. The device 10 employs signal flow progressing generally downwards and to the right, each of the cells 12 to 18 being clock activated and operating on every clock cycle in phase with one another. In the processor 40 of the invention, this scheme is at least conceptually preserved from cycle to cycle. Each processing; unit $P_1$ etc shown in FIG. 5 receives data from the equivalent of above and to the left and outputs to the equivalent of below and to the right. In the case of processing unit $P_1$ on subcycle 1 (V1=1), it receives from register section $42_1$ "above" and memory $M_0$ "to the left". It subsequently provides (internally delayed) outputs "below" and "to the right" via memory $M_0$, the outputs to the right being for use on the next cycle (subcycle 16=V2). However, within a cycle, each of the processing units $P_1$ to $P_8$ deals with the conceptual internal cell locations allocated to it in reverse order compared to prior art data flow. Thus the first locations to be processed are those lying on an upper right to lower left diagonal (V1=1). Locations are processed in succession upwardly and to the left; eg processing unit $P_1$ executes computations corresponding to internal cell locations in which the row and column numbers reduce alternately by unity between successive subcycles. For units $P_5$ to $P_8$, a discontinuous shift occurs after top row subcycles. On subcycle 1, the computations of units $P_3$ to $P_8$ correspond to internal cell locations on an array diagonal extending to the upper right hand corner. Unit $P_i$ on subcycle 15 is processing the internal cell location at row (9-i), column (8+i) (i=1 to 7) in FIG. 5. (For comparison with FIG. 1, the column number should be increased by 1 to allow for the extra column incorporating the uppermost boundary cell 14.) On subcycle 1, the equivalent for i=1 to 8 is column (7+i) with unchanged row number (9-i).

The reason for the conceptual reversing of the order of processing internal cell locations as indicated in FIG. 5 is to ensure that intermediate computed values stored in memories or registers are not overwritten before they are needed. For example, referring to FIG. 8 once more, on subcycle 3 processing unit $P_1$ overwrites the contents of address $M_1 0$ which it read on the previous subcycle. The new value written to address $M_1 0$ remains there to be read and then overwritten on the subsequent cycle fourteen subcycles later. If this procedure were to be reversed, the contents of address $M_1 0$ would be overwritten before being read during a cycle. In this connection it is emphasised that each of the processing units $P_1$ to $P_8$ employs inputs generated on the preceding cycle and required to be unaffected by intervening computations. To avoid unwanted overwriting of stored data without the aforesaid order reversal, it would be necessary to provide storage (double buffering)- and address and data buses additional to that shown in FIG. 4.

The conceptual reversal of the location processing order and the relative phasing of the operations of the processing units $P_1$ to $P_8$ is implemented by the respective list of data addresses in each processing unit as illustrated in FIG. 7. The addresses in any list are accessed in succession, and when a processing unit reaches the end of its list it begins again. The relative phasing illustrated in FIG. 5 is implemented by assigning the processing units $P_1$ to $P_8$ appropriate start points for their respective address lists.

The foregoing analysis relating to FIGS. 4 to 9 has not referred to the matter of processor start-up. It was assumed implicitly that, from V1 value or subcycle 1 onwards, the processor 40 was processing data. In the prior art, as shown in FIGS. 1 to 3, it takes 15 cycles after input of $x_{11}$ to the topmost boundary cell 14 for $y_1$ to be input on cycle 16 to the internal cell 12 in the upper right corner. A further fourteen cycles are required for a cumulatively processed result arising inter alia from $y_1$ to reach the lowermost internal cell 12. The start-up phase for a prior art systolic array 10 consequently passes as a wavefront from upper left down to lower right, the wavefront extending orthogonally to its propagation direction. An equivalent start-up phase occurs in the processor 40 of the invention. The first processing unit to operate on meaningful input data is $P_8$ on subcycle 30 at the top left hand corner of FIG. 5. Subcycle 30 is at the end of the second cycle during which $x_{12}$ is to be input to processing unit $P_8$. On this subcycle, unit $P_8$ is carrying out the processing task of the first (leftmost) top row internal cell 12 shown in FIG. 1, which receives successive matrix elements of the kind $x_{n2}$ (n=1, 2 . . . ). On subcycles 44 and 45, which are in the cycle (not shown), unit P reads in $x_{13}$ and $x_{22}$ respectively to carry out the functions of the first and second top row internal cells 12 of FIG. 1. This start-up phase proceeds along rows and down columns in the FIG. 5 representation. Eventually, on subcycle 437, the second subcycle of cycle 30, processing unit $P_1$ receives inputs derived from $x_{11}$ to $x_{1,15}$ and $y_1$. It computes a result corresponding to the first meaningful output from the lowermost internal cell 12 in the FIG. 1 processor 10. The start-up phase is then complete. Start-up phases are well understood in the fields of systolic arrays and digital electronics and will not be described further. It may be desirable to make provision for ignoring or inhibiting those outputs from the processor 40 which do not correspond to real inputs.

The processor 40 requires an equivalent of the chain of boundary cells 14 and delay latches 16 in order to operate on a data matrix $\underline{X}$. It is necessary to compute parameters c and s from values output by processing units $P_1$ and $P_8$, and temporarily stored in memories $M_0$ and $M_8$ for use one cycle later in each case. This is exemplified in FIG. 8 for example on subcycle 6. On this subcycle, unit $P_1$ executes WR1 to $M_0 17$; ie address 17 in memory $M_0$ receives the equivalent of a vertical output of an internal cell 12 destined for a boundary cell 14. The memory $M_0$ is therefore required to be interfaced to a device which will access $M_0 17$, compute c and s rotation parameters as shown in FIG. 2, and write c and s to $M_0 14$ and $M_0 13$ respectively for use on the next cycle. This is to be carried out on alternate subcycles, ie each occasion that unit $P_1$ is shown closely adjacent to memory $M_0$ in FIG. 5. Similarly, memory $M_8$ is required to be interfaced to a second like device arranged to access it on alternate subcycles for computation and return of rotation parameters. This second like device is required to receive matrix element $x_{11}$ on the first cycle of operation as indicated in FIGS. 1 and 3. It is also required to receive subsequent row leading matrix elements $x_{n1}$ (n=2,3 . . . ). It will act as the uppermost boundary cell 14 in FIG. 1 to generate c and s rotation parameters to be read as RE2 and RE3 by processing unit $P_8$ at the end of the second cycle (V1=30). These devices are straightforward to implement in practice. They will be processing devices similar to units $P_1$ to $P_8$ and interfaced to respective memories $M_0$ and $M_8$ via the data and address buses shown truncated in FIG. 4.

The processor 40 of the invention incorporates processing units $P_1$ etc with internal memory containing an address look-up table and a store for three delayed values and fifteen coefficients in addition to a program. It is also possible to employ simpler processing devices with less internal memory capacity. In this case, the memories $M_0$ etc might contain address lists and value and coefficient stores, and be associated with counters for counting through address lists of respective processing devices. It may however be less convenient to implement and result in slower processing. This is because commercially available discrete processing devices such as transputers incorporate sufficient internal memory for the purposes of the processing units $P_1$ etc, and it would be inefficient not to use such facilities. However, the processor 40 might well be implemented as an integrated circuit chip or wafer in which individual processing units, registers and memories become respective areas of silicon or gallium arsenide. In this case the most convenient balance between local and remote memory may be chosen.

The processor 40 is designed for the situation in which eight processing units $P_1$ to $P_8$ carry out the functions of one hundred and twenty internal cells 12. In general, a triangular sub-array having n internal cells per (nondiagonal) outer edge has $n(n+1)/2$ cells. This number may be factorised either as n12 and (n+1) or as n and (n+1)/2. Since n is a positive integer, one of n and (n+1) must be an even number. Consequently, $n(n+1)/2$ can always be factorised to two whole numbers, one of which may be treated as the number of processing units and the other the number of internal cells allocated to each processing unit. However, it may be necessary for there to be an odd number of processing units, as opposed to the even number (eight) employed in the processor 40.

Referring to FIG. 10, there is shown an alternative form of processor of the invention, this being indicated generally by 140 and incorporating an odd number (seven) of processing units. Parts in FIG. 10 equivalent to those illustrated in FIG. 4 have like reference characters P, M, D or R with asterisks. Subscript indices are changed to run from 1 to 7 instead of 1 to 8. The processor 140 is very similar to that described earlier, and will not be described in detail. Instead, it is observed that the only substantial difference between the processor 140 and the earlier embodiment is that the former has no direct equivalent of processing unit $P_4$. It has no direct equivalents of $M_4$, $D_4$ and $R_{41}$ in consequence. Units $P_4^*$ to $P_7^*$ are in fact equivalent to units $P_5$ to $P_8$ respectively.

Figure 11:
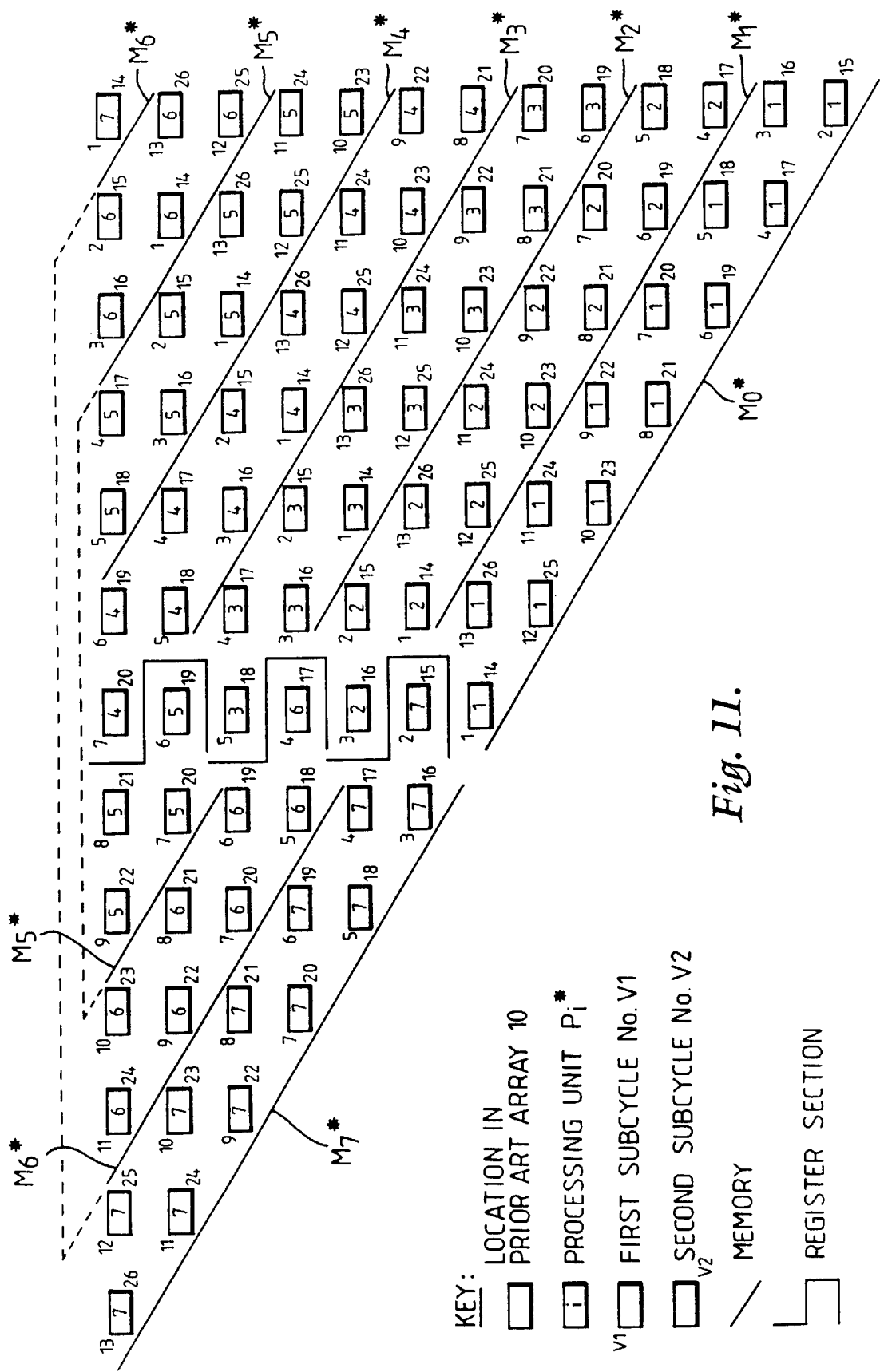

FIG. 11 shows the relative phasing of operation of the processing units $P_1^*$ in terms of V1 and V2 values as before. It is referenced equivalently to FIG. 5. and shows that the processor 140 performs the function of a 13×13 triangular sub-array; ie $n(n+1)/2$ is 13×7 or 91. Each of the seven processing units $P_1^*$ to $P_7^*$ corresponds to thirteen internal cells as shown in the drawing. There are accordingly thirteen subcycles per cycle. In other respects, the processor 140 operates equivalently to the earlier embodiment and will not be described in detail.

Comparison of the regular structures of FIGS. 4 and 11 demonstrates that the invention may be constructed in modular form by cascading integrated circuit chips. Each chip could contain two (or more) processing units such as $P_2$ and $P_8$ together with their associated registers $R_{1\ 1}$ to $R_{14}$, memories $M_2$ and $M_8$ etc. Processing units surplus to requirements on part-used chips would be bypassed. The processors 40 and 140 each employ one more memory $M_0/M_0^*$ than there are processing units $P_1$ etc. This may be accommodated by the use of an extra external memory rather than a largely bypassed integrated circuit. Alternatively, it is possible to omit $M_0$ and connect buses $A_1/B_1$ to $M_8$. This provides for units $P_1$ and $P_8$ together with rotation parameter computing means (previously mentioned) to address a common memory $M_8$. Similar remarks apply to $M_0^*/M_8^*$. may constitute a cumbersome alternative, since it imposes substantial access requirements on memory $M_8$ or $M_8^*$.

The foregoing discussion was directed to the use of n/2 or (n+1)/2 processing units to carry out the function of an n×n triangular array of $n(n+1)/2$ processing units. This may frequently be an optimum implementation, since it combines a substantial reduction in the number of processing units required with a comparatively high degree of parallelism. It should be at least n/2 times faster than a single computer carrying out the whole computation, while employing 1/(n+1) of the number of processing units required for a fully parallel array employing one unit per node as in FIG. 1. However, the invention is not restricted to n/2 or (n+1)/2 processing units simulating an n×n triangular array. FIG. 12 illustrates appropriate phasing of operation for four processing units simulating a 16×16 triangular array. V1 and V2 values up to 68 are given.

A processor of the invention may be arranged to simulate both non-triangular systolic arrays and also arrays in which there are processing cells with differing computational functions. Individual cells may have more than one such function; eg a cell may switch between two computational functions on successive subcycles. For most purposes, however, such an arrangement might be undesirably complex.

We claim:

1. A digital data processor for simulating operation of a parallel processing array, the processor including an assembly of digital processing devices connected to data storing means, wherein:

(a) each processing device is programmed to implement a respective list of sets of storing means data addresses;

(b) each address set contains input data addresses and output data addresses said input data addresses are different from said output data addresses in each address set, and each address set corresponds to data input/output functions of a respective simulated array cell;

(c) each list of address sets corresponds to a respective sub-array of cells of the simulated array, and each such list contains pairs of successive address sets in which the leading address sets have input data addresses which are the same as output data addresses of respective successive address sets, each list being arranged to provide for operations associated with simulated cells to be executed in reverse order to that corresponding to data flow through the simulated array; and (d) each processing device is programmed to employ a respective first address set from said respective list to read input data from input data addresses in said respective first address set and to write output data to output data addresses in said respective first address set, the output data being generated in accordance with a computational function, to employ subsequent address sets in said respective lists in succession in a like manner until the list is complete, and then to repeat this procedure cyclically using said respective list repeatedly.

2. A digital processor according to claim 1, wherein each processing device is arranged to communicate with not more than four other processing devices, and incorporating storing means including register devices and memories connected between respective pairs of processing devices, the address set lists being such that each register device and memory is addressed by not more than one processing device at a time.

3. A digital processor according to claim 2, wherein at least some of the processing devices are arranged to communicate with two of the other processing devices via respective register devices and with a further two of the other processing devices via respective memories, and wherein the address set lists are arranged such that the register devices are addressed less frequently than the memories.

4. A digital processor according to claim 1, wherein at least some of the processing devices include input means arranged for parallel to serial conversion of input data elements.

5. A digital processor according to claim 1, wherein each processing device is arranged to store and update a respective coefficient in relation to each address set in its list.

* * * * *

UNITED STATES PATENT AND TRADEMARK OFFICE
CERTIFICATE OF CORRECTION

PATENT NO. : 5,845,123
DATED : December 1, 1998
INVENTOR(S) : JOHNSON et al.

Figure 4A:
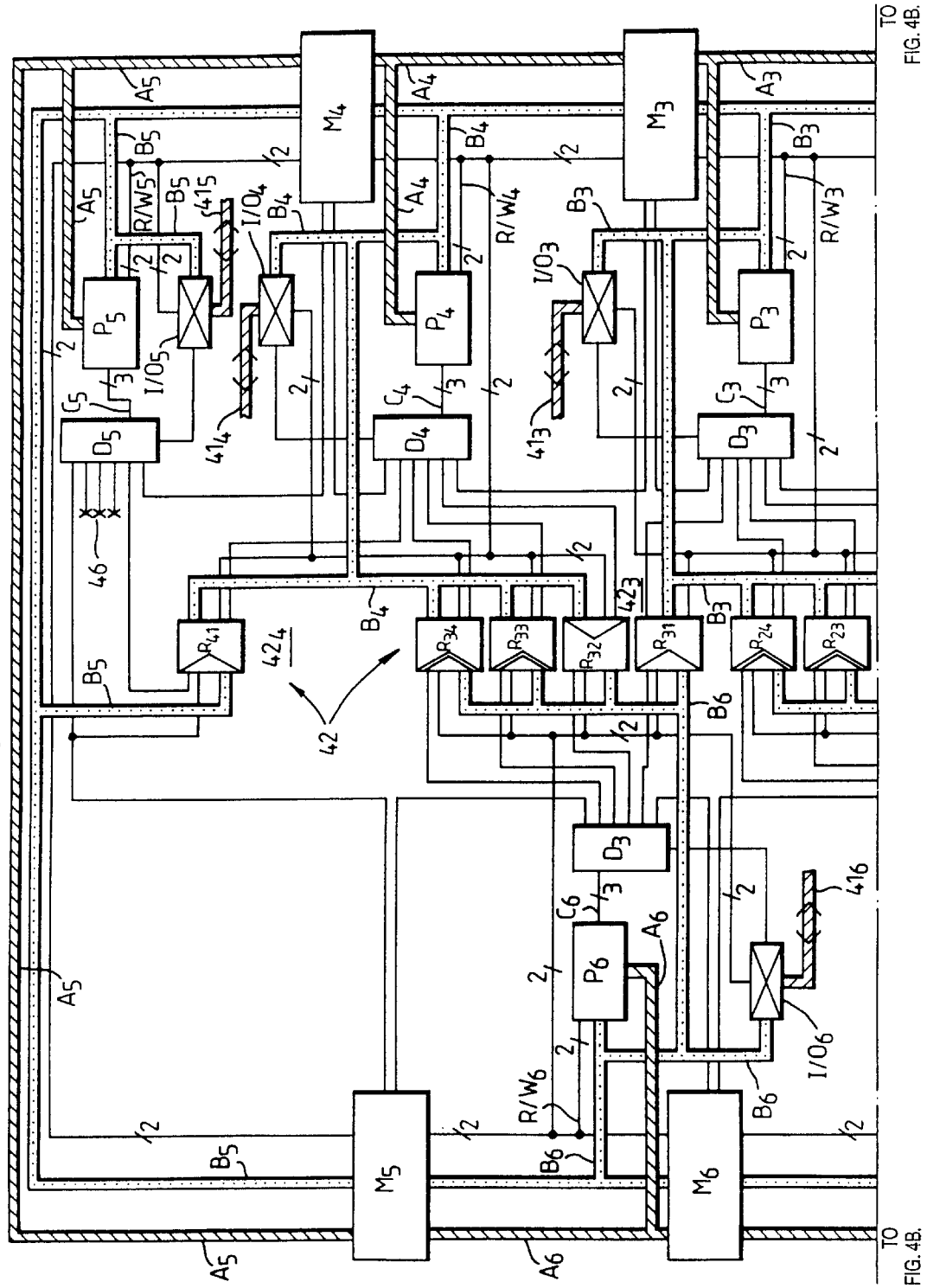
FIG. 4 is a block diagram of a processor of the invention arranged to simulate part of the FIG. I array and incorporating eight processing units.

It is certified that error appears in the above-indentified patent and that said Letters Patent is hereby corrected as shown below:

Column 3, line 53, "FIG. 4 is" should read --FIGS. 4A and 4A are--

Figure 4B:
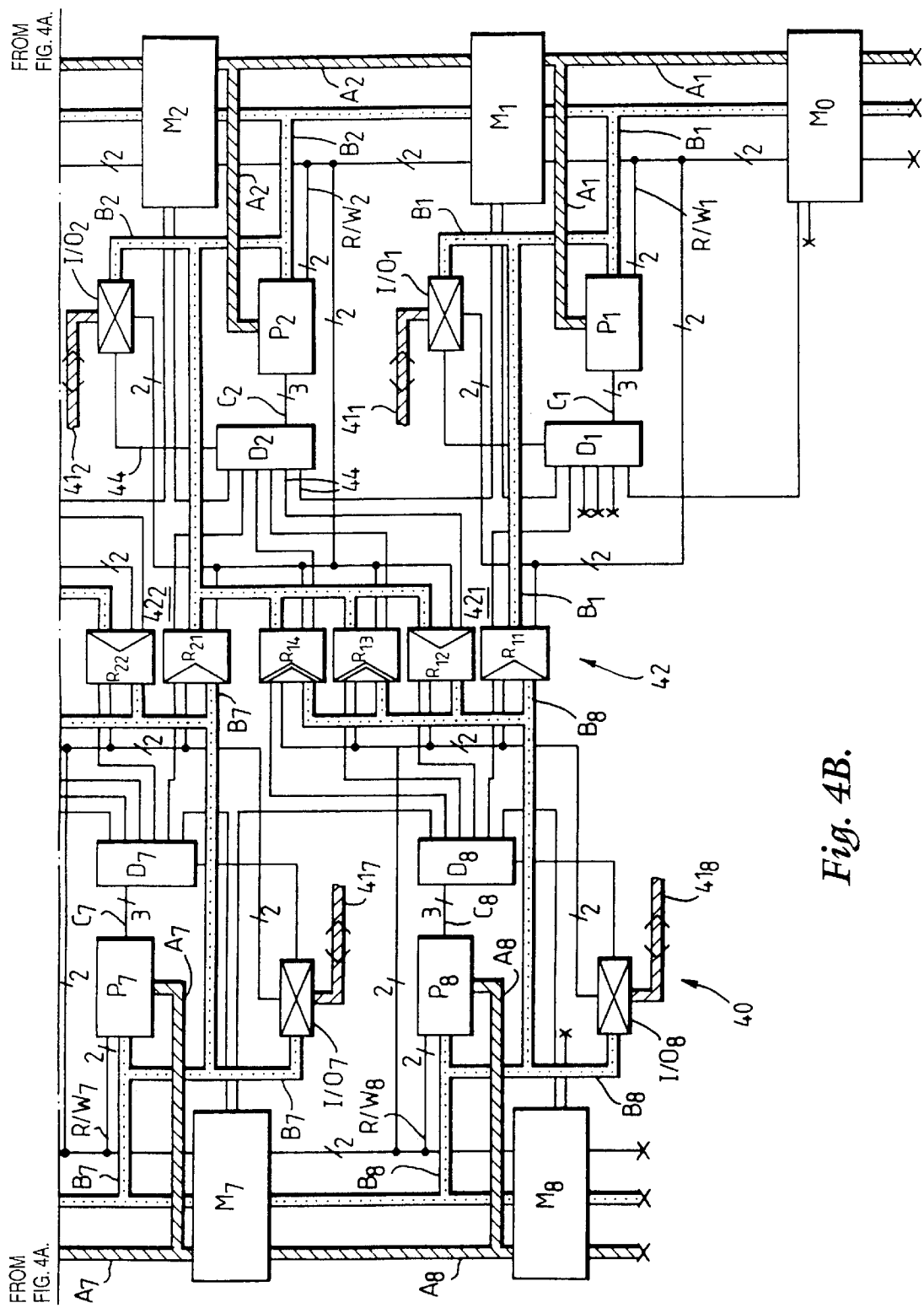

Column 3, line 56, "FIG. 5 illustrates" should read --FIGS. 5A and 5B illustrate--; and "FIG. 4" should read --FIGS. 4A and 4B--.

Column 3, lines 59 and 63, "FIG. 4" should read --FIGS. 4A and 4B--.

Figure 10A:
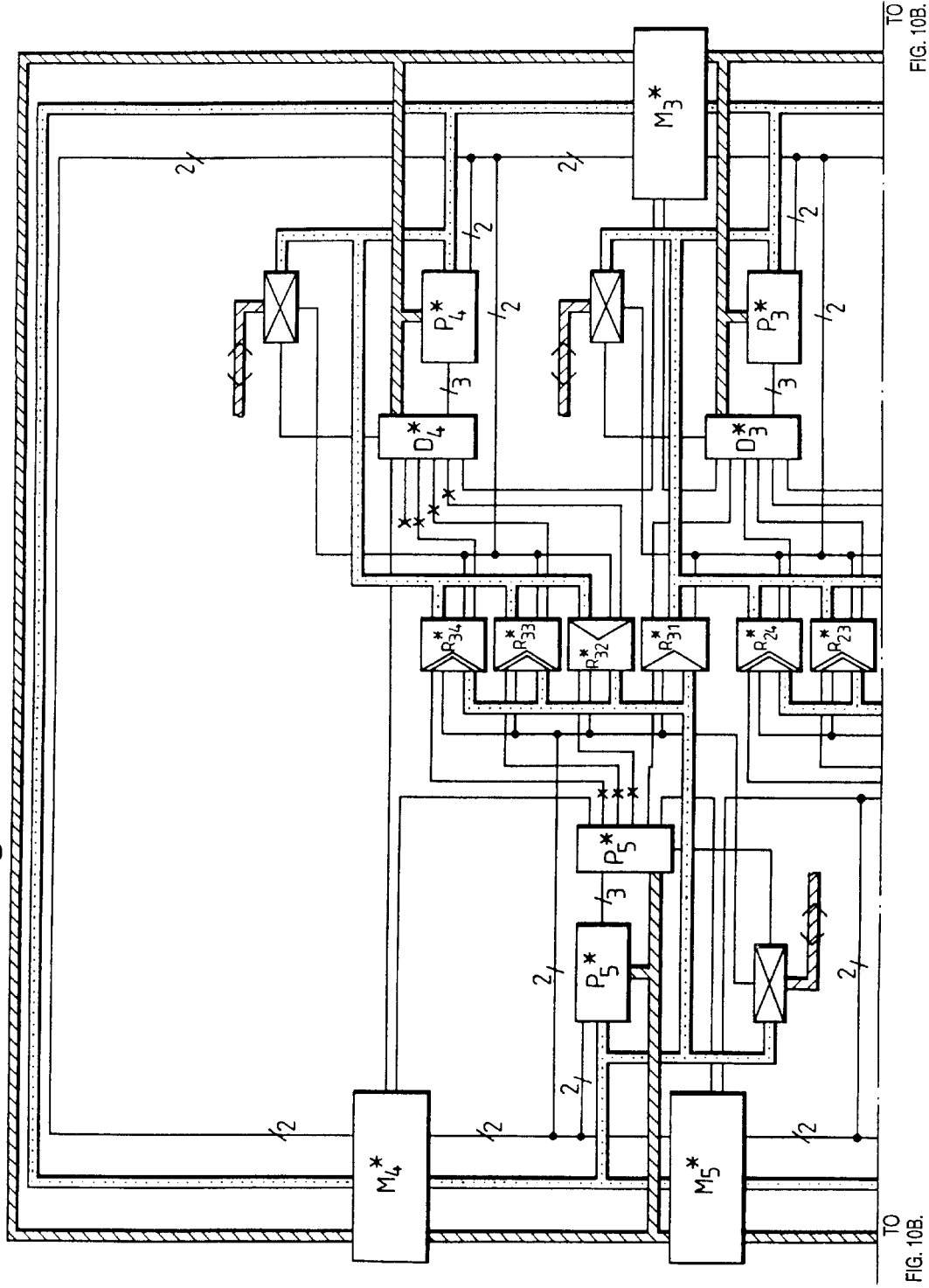
FIG. 10 and 11 illustrate the construction and mode of operation of an alternative embodiment of the invention incorporating an odd number of processing units.
Figure 10B:
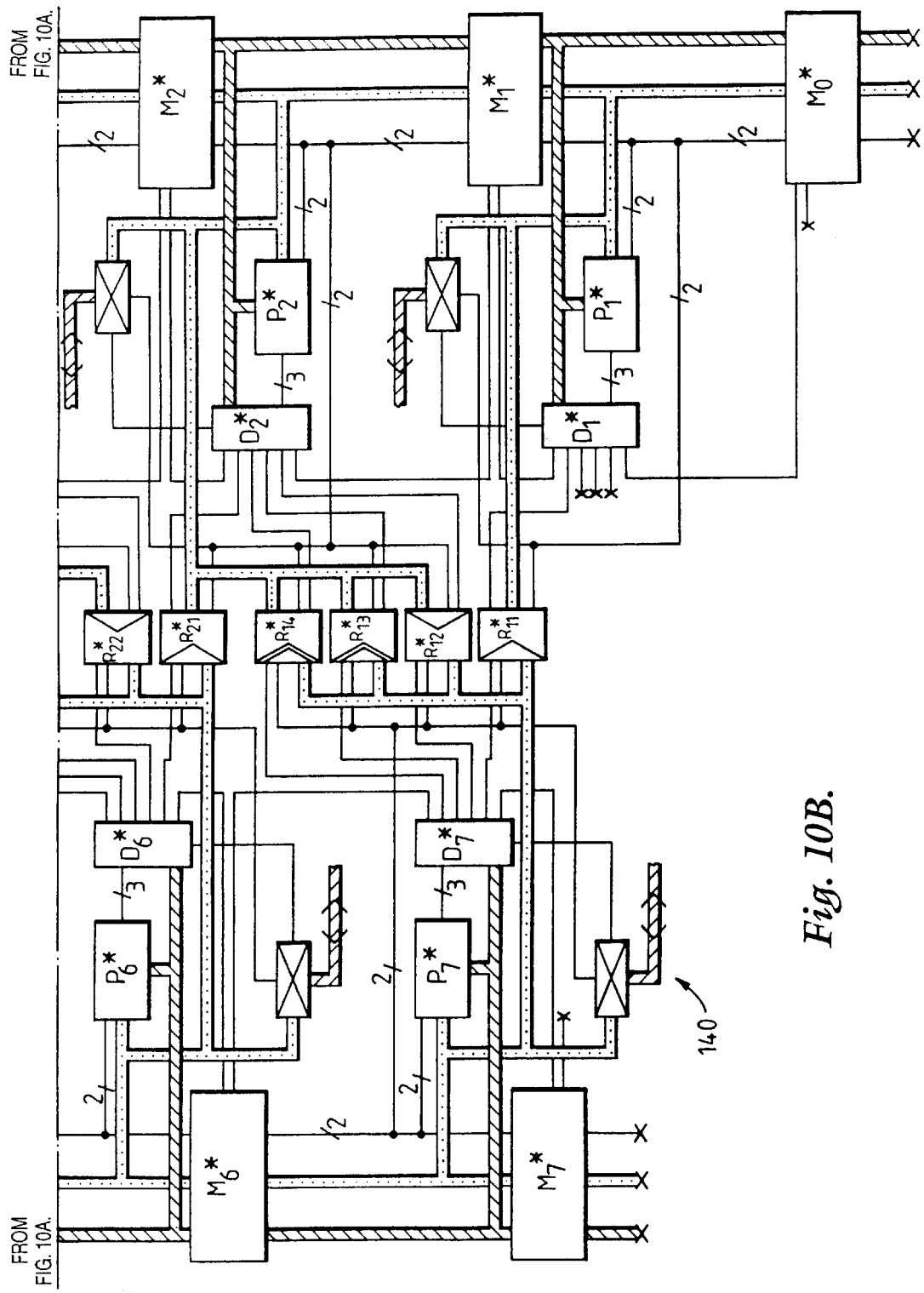

Column 4, line 1, "FIG. 10" should read --FIGS. 10A and 10B--.

Figure 12A:
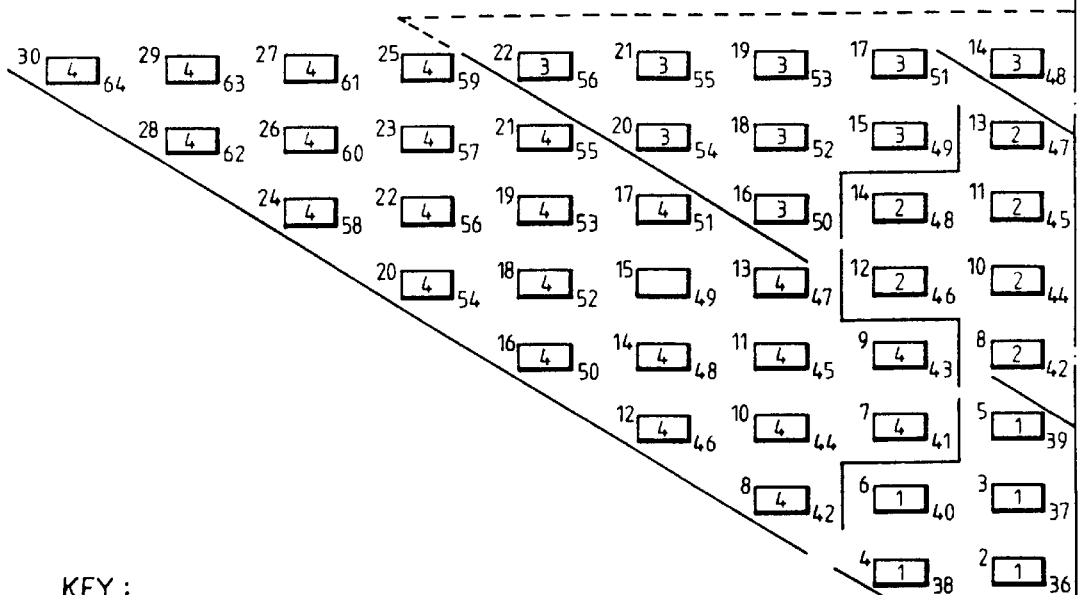
FIG. 12 illustrates the mode of operation of a further embodiment of the invention incorporating four processing devices.
Figure 12B:
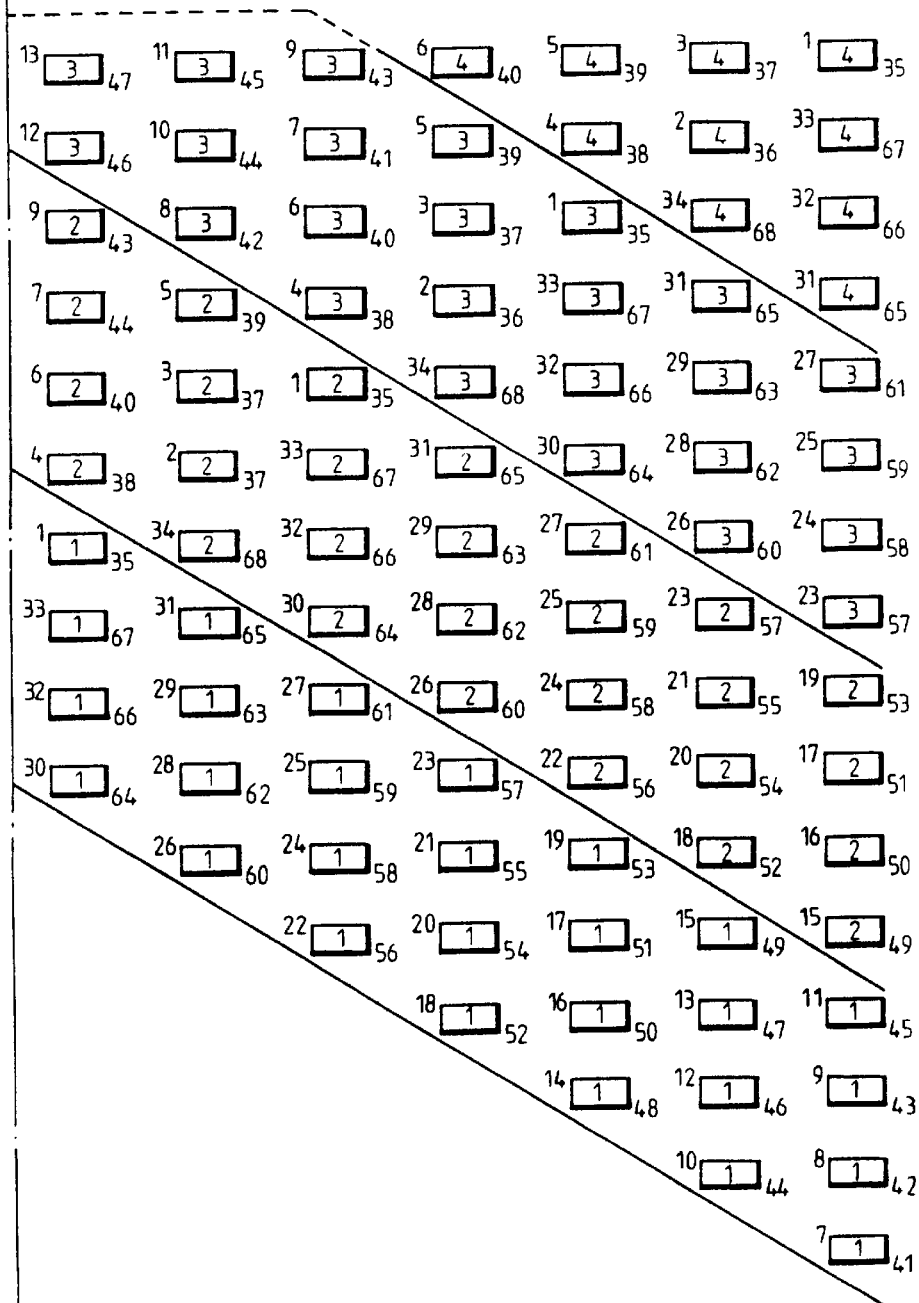

Column 4, line 4, "FIG. 12 illustrates" should read --FIGS. 12A and 12B illustrate--.

Column 6, lines 39 and 57, "FIG. 4" should read --FIGS. 4A and 4B--.

Column 7, lines 31 and 65, "FIG. 5" should read --FIGS. 5A and 5B--.

Column 8, lines 22 and 51, "FIG. 5" should read --FIGS. 5A and 5B--.

Column 8, line 47, "FIG. 5 is" should read --FIGS. 5A and 5B are--.

Column 8, line 67, "4," should read --4A and 4B,--.

Column 9, line 62, "FIG. 5" should read --FIGS. 5A and 5B--.

Column 10, lines 11 and 47, "FIG. 5" should read --FIGS. 5A and 5B--.

Column 11, line 19, "FIG. 5" should read --FIGS. 5A and 5B--.

Column 11, line 33, "5," should read --5A AND 5B--.

Column 11, line 66, "FIG. 4" should read --FIGS. 4A and 4B--.

Column 12, line 4, "FIG. 4" should read --FIGS. 4A and 4B--.

Column 12, lines 15 and 46, "FIG. 5" should read --FIGS. 5A and 5B--.

Column 13, line 1, "5" should read --5A and 5B--.

Column 13, lines 9 and 30, "FIG. 5" should read --FIGS. 5A and 5B--.

Column 13, lines 37 and 60, "FIG. 5 is" should read --FIGS. 5A and 5B are--.

UNITED STATES PATENT AND TRADEMARK OFFICE
CERTIFICATE OF CORRECTION

PATENT NO. : 5,845,123
DATED : December 1, 1998
INVENTOR(S) : JOHNSON et al.

It is certified that error appears in the above-indentified patent and that said Letters Patent is hereby corrected as shown below:

Column 13, line 53, "FIG. 4" should read --FIGS. 4A and 4B--.

Column 13, line 63, "4" should read --4A and 4B--.

Column 14, lines 11, 21, 47, "FIG. 5" should read --FIGS. 5A and 5B--;

Column 14, line 60, "FIG. 4" should read --FIGS. 4A and 4B--.

Column 15, lines 28 and 31, "FIG. 10" should read --FIGS. 10A and 10B--;

Column 15, line 32 and 52, "FIG. 4" should read --FIGS. 4A and 4B--;

Column 15, line 43, "FIG. 5" should read --FIGS. 5A and 5B--.

Column 16, lines 15 and 16, "FIG. 12 illustrates" should read --FIGS. 12A and 12B illustrate--.

Signed and Sealed this

Twenty-sixth Day of October, 1999

Q. TODD DICKINSON

*Attest:*

*Attesting Officer*    Acting Commissioner of Patents and Trademarks